United States Patent
Yasuda et al.

(10) Patent No.: US 10,448,253 B2
(45) Date of Patent: Oct. 15, 2019

(54) WIRELESS TERMINAL

(71) Applicant: NEC CORPORATION, Tokyo (JP)

(72) Inventors: Masato Yasuda, Tokyo (JP); Kazuaki Nakajima, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 136 days.

(21) Appl. No.: 15/537,517

(22) PCT Filed: Jan. 6, 2016

(86) PCT No.: PCT/JP2016/000038
§ 371 (c)(1),
(2) Date: Jun. 19, 2017

(87) PCT Pub. No.: WO2016/111246
PCT Pub. Date: Jul. 14, 2016

(65) Prior Publication Data
US 2017/0339566 A1  Nov. 23, 2017

(30) Foreign Application Priority Data
Jan. 8, 2015  (JP) ................ 2015-002342

(51) Int. Cl.
*H04L 29/06* (2006.01)
*H04W 12/08* (2009.01)
(Continued)

(52) U.S. Cl.
CPC ........ *H04W 12/08* (2013.01); *H04L 67/104* (2013.01); *H04L 67/141* (2013.01); *H04L 69/24* (2013.01);
(Continued)

(58) Field of Classification Search
CPC ..... H04W 12/08; H04W 76/14; H04W 84/12; H04W 4/46; H04W 92/18; H04L 67/104; H04L 67/141; H04L 69/24; H04L 69/16
See application file for complete search history.

(56) References Cited

U.S. PATENT DOCUMENTS

2004/0044904 A1* 3/2004 Yamazaki ........... H04L 12/1822
726/29
2008/0077425 A1* 3/2008 Johnson ............... G06Q 10/103
705/301
(Continued)

FOREIGN PATENT DOCUMENTS

JP 2004-145858 A  5/2004
JP 2010-541514 A  12/2010
(Continued)

OTHER PUBLICATIONS

Wi-Fi Alliance Technical Committee P2P Task Group Wi-Fi Peer to Peer (P2P) Technical Specification Version 1.1, 2010, 159 pages.
(Continued)

*Primary Examiner* — Ghodrat Jamshidi
(74) *Attorney, Agent, or Firm* — Sughrue Mion, PLLC

(57) ABSTRACT

The present invention provides a communication method in a wireless communication network in which a first wireless terminal establishes a peer-to-peer wireless connection with a second wireless terminal. The first terminal determines whether or not the second wireless terminal is a universal terminal on the basis of information received from the second wireless terminal. The first wireless terminal controls access to a resource in the first wireless terminal by the second wireless terminal after a connection is established in accordance with the result of the determination.

17 Claims, 27 Drawing Sheets

(51) Int. Cl.
    *H04W 84/12*     (2009.01)
    *H04W 76/14*     (2018.01)
    *H04L 29/08*     (2006.01)
    *H04W 12/06*     (2009.01)
    *H04W 92/18*     (2009.01)
    *H04W 4/46*     (2018.01)

(52) U.S. Cl.
    CPC ........... *H04W 12/06* (2013.01); *H04W 76/14* (2018.02); *H04W 84/12* (2013.01); *H04L 69/16* (2013.01); *H04W 4/46* (2018.02); *H04W 92/18* (2013.01)

(56) References Cited

U.S. PATENT DOCUMENTS

| | | | |
|---|---|---|---|
| 2009/0094680 A1 | 4/2009 | Gupta et al. | |
| 2010/0138382 A1* | 6/2010 | Nagoya | G06F 21/10 707/609 |
| 2013/0148149 A1* | 6/2013 | Park | G06F 3/1296 358/1.13 |
| 2014/0019543 A1* | 1/2014 | Hyun | H04L 67/104 709/204 |
| 2014/0030982 A1* | 1/2014 | Cardona | G01S 5/14 455/67.11 |
| 2014/0053281 A1* | 2/2014 | Benoit | H04L 12/2809 726/29 |
| 2014/0199969 A1* | 7/2014 | Johnsson | H04W 56/00 455/411 |
| 2014/0325049 A1* | 10/2014 | Goto | H04L 67/16 709/223 |
| 2015/0113277 A1* | 4/2015 | Harkins | H04L 9/083 713/171 |
| 2015/0180978 A1* | 6/2015 | Canpolat | H04L 5/0092 370/329 |
| 2016/0139755 A1* | 5/2016 | Bushmitch | H04L 9/32 715/707 |
| 2016/0143072 A1* | 5/2016 | Kondabattini | H04W 8/005 455/39 |
| 2016/0302026 A1* | 10/2016 | Lee | H04W 76/14 |
| 2017/0257819 A1* | 9/2017 | McCann | H04W 48/14 |

FOREIGN PATENT DOCUMENTS

| | | |
|---|---|---|
| JP | 2011-035457 A | 2/2011 |
| JP | 2013-507029 A | 2/2013 |
| JP | 2014-033282 A | 2/2014 |
| JP | 2014-216767 A | 11/2014 |
| JP | 2014-220609 A | 11/2014 |

OTHER PUBLICATIONS

International Search Report for PCT/JP2016/000038, dated Mar. 29, 2016 (PCT/ISA/210).

Written Opinion for PCT/JP2016/000038, dated Mar. 29, 2016 (PCT/ISA/237).

* cited by examiner

"Dev1234:XXX"

WIRELESS TERMINAL

CROSS REFERENCE TO RELATED APPLICATIONS

This application is a National Stage of International Application No. PCT/JP2016/000038 filed Jan. 6, 2016, claiming priority based on Japanese Patent Application No. 2015-002342 filed Jan. 8, 2015, the contents of all of which are incorporated herein by reference in their entirety.

TECHNICAL FIELD

The present invention relates to a wireless terminal cable of establishing a peer-to-peer wireless connection, a communication control method and a program therefor, and a communication system and a communication method.

BACKGROUND ART

In recent years, Wi-Fi Direct is noted as an interterminal communication method in consideration of achievement of broadband, enhancement of security, and so on. While a prior Wi-Fi network operates in an infrastructure mode in which a specific device serves as an access point (AP), a Wi-Fi Direct compliant network allows communication in a group by making not a specific device but any P2P terminal serve as the owner of the group (a group owner) (for example, see Non-Patent Document 1). A group owner is a P2P terminal operating as an access point of a group and, as the master of the group, can form a group in which another P2P terminal serves as a slave (client).

A P2P group formed in this manner is allowed to share data and transfer data at high speeds between terminals without connecting to the Internet or the like. In particular, supporting a strong security protocol in Wi-Fi Direct can realize higher security than in the conventional ad hoc mode (IBSS: Independent Basic Service Set, or the like).

Further, an example of a method for configuring a P2P group is described in Patent Document 1. According to Patent Document 1, for exchange of P2P (Peer to Peer) capability information, a communication terminal can exchange the information with another communication terminal without user intervention and request establishment of a P2P connection. In the exchange of P2P capability information, a connection type (Wi-Fi Direct, or the like), a protocol, corresponding authentication, or parameter information showing a security method or the like is exchanged. Then, the communication terminal determines whether or not to establish a P2P connection with the other communication terminal on the basis of the discovered P2P type, or the like.

Patent Document 1: Japanese Unexamined Patent Application Publication (Translation of PCT Application) No. JP-A 2013-507029

Non-Patent Document 1: Wi-Fi Alliance Technical Committee P2P Task Group Wi-Fi Peer-to-Peer (P2P) Technical Specification Version 1.1

In a mobile communication system using Wi-Fi Direct, a mobile object is equipped with a wireless terminal, and wireless terminals close to each other perform communication. Herein, a mobile object equipped with a wireless terminal is, for example, a vehicle such as a car, fixed equipment such as a road-side device, a road sign and a security camera, and a pedestrian. Reliability of a wireless terminal provided to a mobile object differs with the kind of the mobile object. That is to say, in a general wireless terminal such as a smartphone carried by a pedestrian, the user can freely install an application program, so that reliability thereof tends to be lower than a wireless terminal dedicated for execution of a special service provided to a vehicle or fixed equipment, in which a program is updated under management by a company like an automaker or national/local governments. In other words, cracking including peep, falsification and corruption of data and a program of any person's wireless terminal tends to be done through a wireless terminal carried by a pedestrian. In this specification, a wireless terminal such as a smartphone, in which the user can freely install an application program, is defined as a universal terminal. On the other hand, a wireless terminal provided to a vehicle or fixed equipment, in which a program is updated under management by a company like an automaker or national/local governments, is defined as a dedicated terminal.

However, there has never been an idea of changing access authority depending on the type of a connection destination wireless terminal, especially, whether the terminal is a universal terminal or not. Therefore, it has been difficult to execute different access control depending on whether a connection destination wireless terminal is a universal terminal or not.

SUMMARY

An object of the present invention is to provide a wireless terminal which solves the problem described above, that is, the problem that it is difficult to execute different access control depending on the type of a connection destination wireless terminal.

A wireless terminal as an aspect of the present invention is a wireless terminal capable of establishing a peer-to-peer wireless connection with an another wireless terminal. The wireless terminal includes: a terminal type determination part configured to determine whether or not the another wireless terminal is a universal terminal on a basis of information received from the another wireless terminal; and an access control part configured to control access to a resource in the wireless terminal by the another wireless terminal after a connection is established in accordance with a result of determination by the terminal type determination part.

A communication control method of a wireless terminal as another aspect of the present invention is a communication control method of a wireless terminal capable of establishing a peer-to-peer wireless connection with an another wireless terminal. The communication control method includes: determining whether or not the another wireless terminal is a universal terminal on a basis of information received from the another wireless terminal; and controlling access to a resource in the wireless terminal by the another wireless terminal after a connection is established in accordance with a result of the determining.

A computer program as another aspect of the present invention includes instructions for causing a computer, which is capable of establishing a peer-to-peer wireless connection with a wireless terminal, to function as: a terminal type determination part configured to determine whether or not the wireless terminal is a universal terminal on a basis of information received from the wireless terminal; and an access control part configured to control access to a resource in the computer by the wireless terminal after a connection is established in accordance with a result of determination by the terminal type determination part.

A communication method as another aspect of the present invention is a communication method in a wireless communication network in which a first wireless terminal establishes a peer-to-peer wireless connection with a second wireless terminal. The communication method includes: determining, by the first wireless terminal, whether or not the second wireless terminal is a universal terminal on a basis of information received from the second wireless terminal; and controlling, by the first wireless terminal, access to a resource in the first wireless terminal by the second wireless terminal after a connection is established in accordance with a result of the determining.

A communication system as another aspect of the present invention is a communication system in a wireless communication network including a first wireless terminal and a second wireless terminal capable of establishing a peer-to-peer wireless connection with the first second wireless terminal. The first wireless terminal includes: a terminal type determination part configured to determine whether or not the second wireless terminal is a universal terminal on a basis of information received from the second wireless terminal; and an access control part configured to control access to a resource in the first wireless terminal by the second wireless terminal after a connection is established in accordance with a result of determination by the terminal type determination part.

With the configurations described above, the present invention allows execution of different access control depending on whether another terminal intending to connect is a universal terminal or not.

BRIEF DESCRIPTION OF DRAWINGS

FIG. 5 is a diagram showing an example of a type identifier stored in the wireless terminal according to the first exemplary embodiment of the present invention;

EXEMPLARY EMBODIMENTS

Next, an example embodiment of the present invention will be described in detail with reference to the drawings.

[First Exemplary Embodiment]

Figure 1:
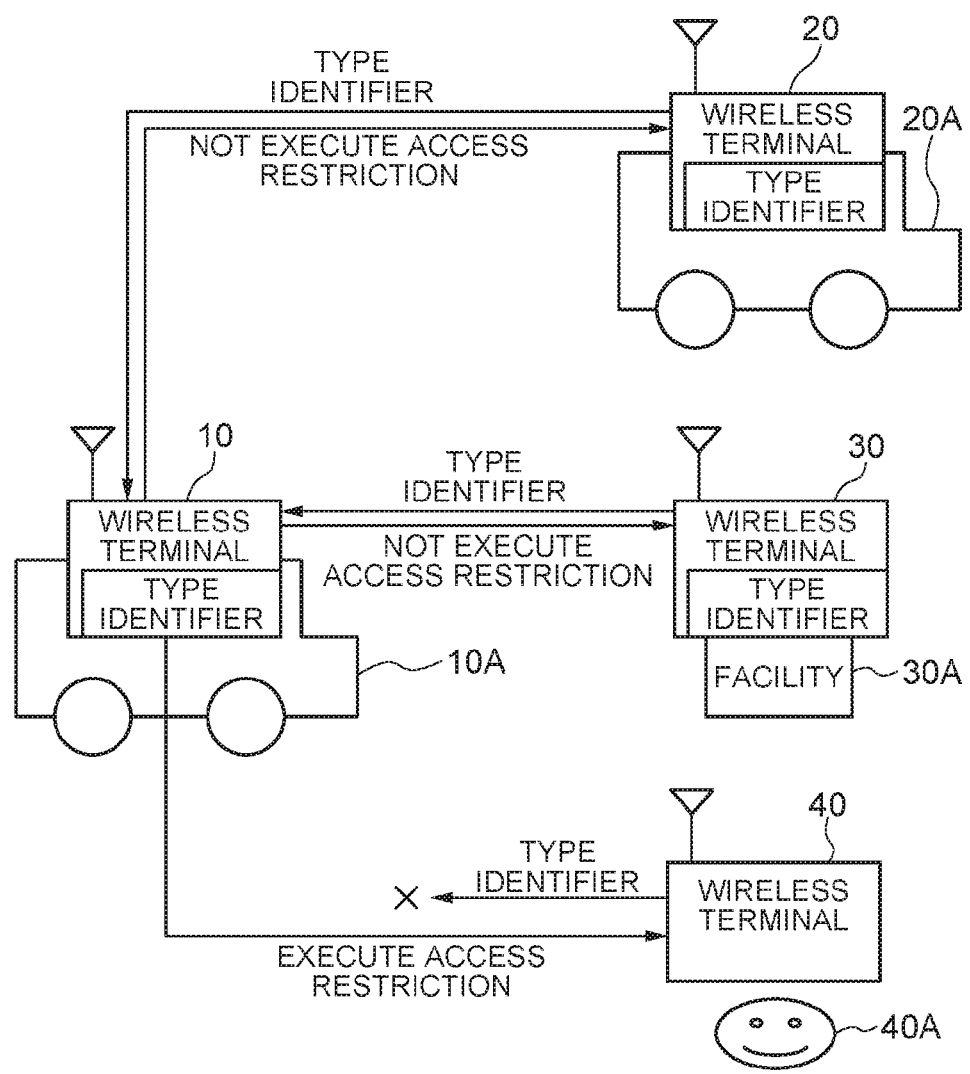
FIG. 1 is a block diagram of a communication system according to a first exemplary embodiment of the present invention.

With reference to FIG. 1, a wireless terminal 10 according to a first exemplary embodiment of the present invention can establish peer-to-peer (abbreviated as P2P hereinafter) wireless communication with other wireless terminals 20, 30 and 40. As such a wireless communication method, Wi-Fi Direct is used in this exemplary embodiment. Meanwhile, a communication method is not limited to Wi-Fi Direct as far as it can establish P2P communication with another wireless terminal.

The wireless terminal 10 is a wireless terminal incorporated in a vehicle 10A by a reliable authority such as an automaker and a car dealer as shown in FIG. 1. The wireless terminal 10 retains an identifier (referred to as a type identifier hereinafter) representing it is a dedicated terminal, and has a function to exchange type identifiers with the other wireless terminal 20, 30 or 40 before a process to connect with the other wireless terminal is completed. The wireless terminal 10 has a function to, when it fails in acquiring a type identifier from the other wireless terminal, determine the other wireless terminal is a universal terminal such as a smartphone and, after establishing a connection, restrict access to a resource in the wireless terminal 10 by the other wireless terminal. On the other hand, when the wireless terminal 10 succeeds in acquiring a type identifier from the other wireless terminal intending to establish a wireless connection, the wireless terminal 10 determines the other wireless terminal is not a universal terminal, that is, the other wireless terminal is a dedicated terminal and does not execute access restriction described above after establishing a connection. Moreover, the wireless terminal 10 has a function to, regardless of the presence or absence of access restriction, when the connection process is completed, form a P2P group and establish wireless communication with the other wireless terminal.

Among the other wireless terminals 20, 30 and 40 existing near the wireless terminal 10, the wireless terminal 20 is a dedicated terminal incorporated in a vehicle 20A by a reliable authority like an automaker in the same manner as the wireless terminal 10. The wireless terminal 30 is a dedicated terminal incorporated in a facility 30A such as a road-side device, a road sign and a security camera by a reliable authority like a public highway corporation. The wireless terminals 20 and 30 have the same function as the wireless terminal 10.

On the other hand, the wireless terminal 40 is a universal terminal carried by a pedestrian. For example, the wireless terminal 40 is a smartphone terminal owned by a pedestrian 40A as shown in FIG. 1. Unlike the wireless terminals 10, 20 and 30, the wireless terminal 40 does not retain a type identifier representing it is a dedicated terminal. Therefore, when establishing a wireless connection to another wireless terminal, the wireless terminal 40 cannot notify the type identify described above to the other wireless terminal.

Figure 2:
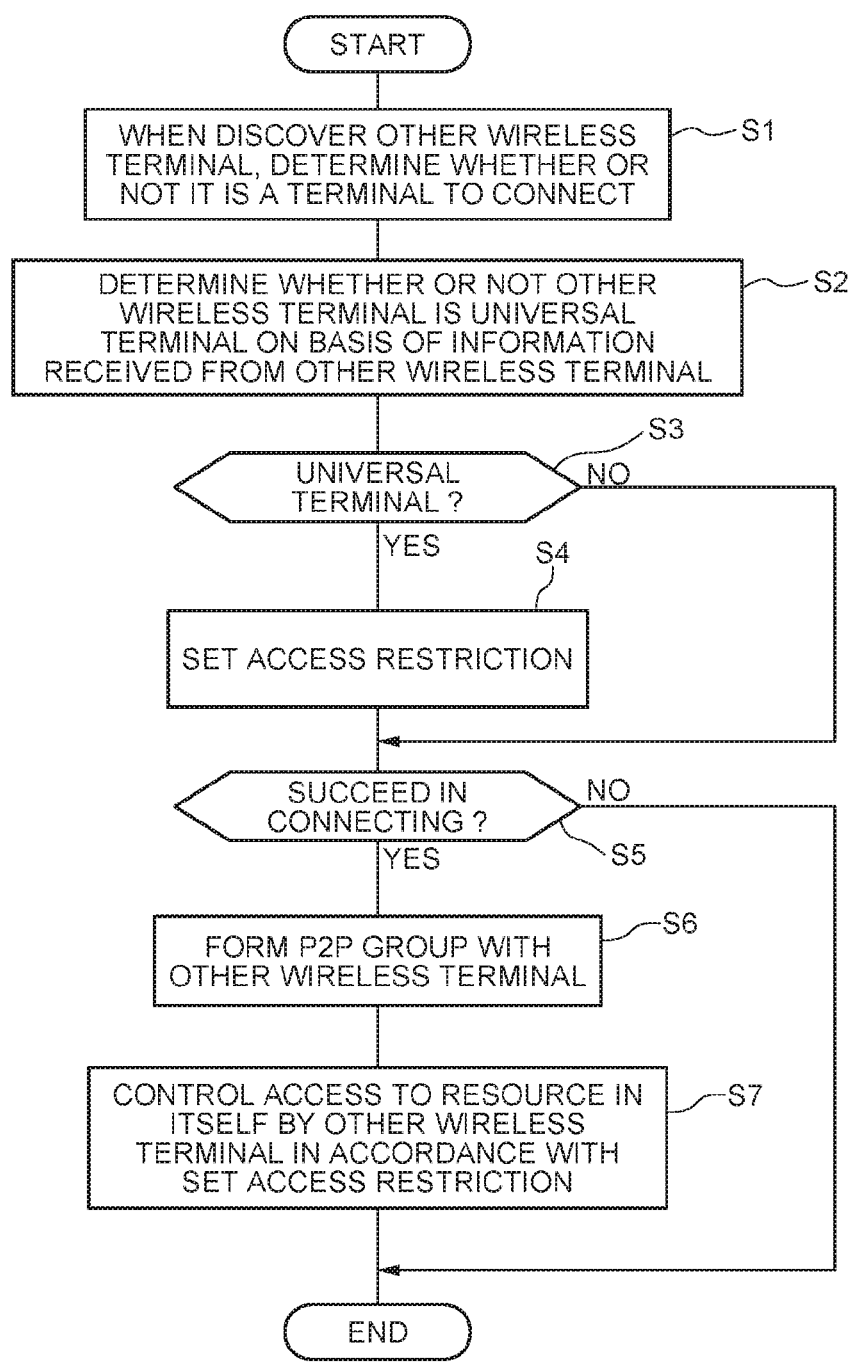
FIG. 2 is a flowchart showing the operation of a wireless terminal according to the first exemplary embodiment of the present invention.

FIG. 2 is a flowchart showing the operation of the wireless terminal 10 according to this exemplary embodiment. With reference to FIG. 2, an operation of the wireless terminal 10 according to this exemplary embodiment to connect to another wireless terminal and form a P2P group will be described below.

When discovering another wireless terminal close thereto, the wireless terminal 10 determines whether the other wireless terminal is a terminal to connect or not (S1). The wireless terminal 10 executes processing at step S2 and later only when the other wireless terminal is a terminal to connect. In a case where the other wireless terminal is not a terminal to connect, the wireless terminal 10 stops at step S1 and continues discovery of another wireless terminal close thereto.

When establishing a wireless connection with the other wireless terminal close thereto, the wireless terminal 10 determines whether the other wireless terminal is a universal terminal or not on the basis of information received from the other wireless terminal (S2). To be specific, the wireless terminal 10 determines that the other wireless terminal from which a predetermined type identifier can be received is a dedicated terminal, whereas the wireless terminal 10 determines that the other wireless terminal from which the predetermined type identifier cannot be received is a universal terminal.

Next, the wireless terminal 10 sets a predetermined access restriction on the other wireless terminal determined as a universal terminal (steps S3 and S4). The wireless terminal 10 does not set the predetermined access restriction on a dedicated terminal. Next, when succeeding in connection with the other connection terminal (YES at step S5), the wireless terminal 10 forms a P2P group with the other wireless terminal (S6). In a case where the access restriction has been set on the other wireless terminal, the wireless terminal 10 controls access to a resource in the wireless terminal 10 by the other wireless terminal in accordance with the access restriction (S7).

Because the wireless terminal 10 operates in a manner as described above, it can receive a predetermined type identifier from each of the wireless terminals 20 and 30 when establishing a wireless connection with each of the wireless terminals 20 and 30 shown in FIG. 1, so that it determines that each of the wireless terminals 20 and 30 is not a universal terminal and, after establishing a connection, does not restrict access to a resource in the wireless terminal 10 by each of the wireless terminal 20 and 30. On the other hand, the wireless terminal 10 cannot receive a predetermined type identifier from the wireless terminal 40 when establishing a wireless connection to the wireless terminal 40 shown in FIG. 1, so that it determines that the wireless terminal 40 is a universal terminal and, after establishing a connection, restricts access to a resource in the wireless terminal 10 by the wireless terminal 40.

Thus, according to this exemplary embodiment, the wireless terminal 10 can execute different access control depending on whether another wireless terminal intending to connect is a universal terminal or not.

Below, the configuration and operation of the wireless terminal 10 according to this exemplary embodiment will be described in more detail.

Figure 3:
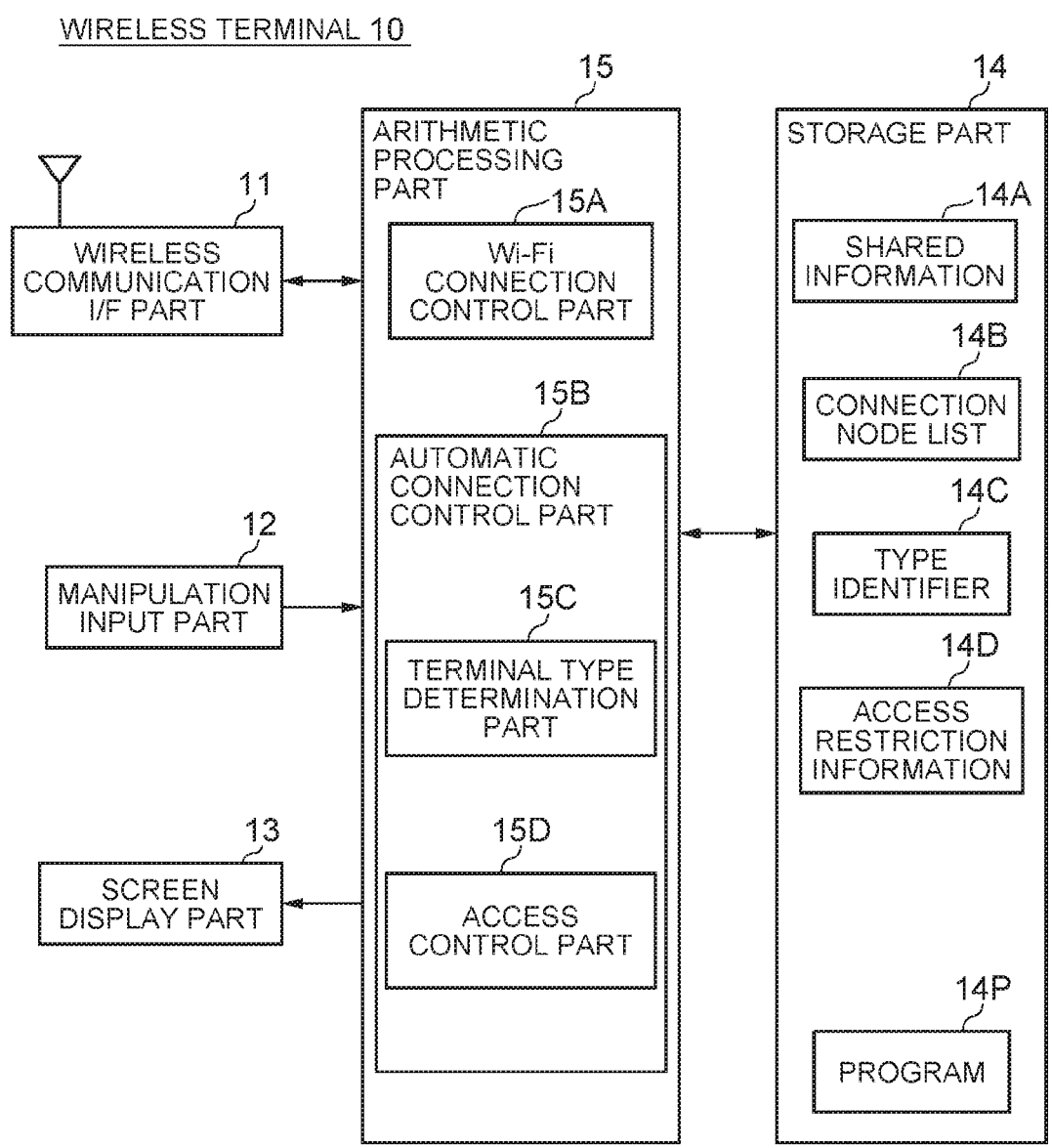
FIG. 3 is a block diagram of the wireless terminal according to the first exemplary embodiment of the present invention.

FIG. 3 is a block diagram showing an example of the configuration of the wireless terminal 10. The wireless terminal 10 in this example includes a wireless communication interface part (referred to as the wireless communication I/F part hereinafter) 11, a manipulation input part 12, a screen display part 13, a storage part 14, and an arithmetic processing part 15.

The wireless communication I/F part 11 is formed of a dedicated wireless communication circuit and has a function to perform wireless communication with various types of devices such as another wireless terminal connected thereto via the wireless communication circuit. In this exemplary embodiment, the wireless communication I/F part 11 is an interface of a wireless LAN compliant with Wi-Fi Direct.

A manipulation input part 12 is formed of a manipulation input device such as a keyboard and a mouse, and has a function to detect operator's manipulation and output it to the arithmetic processing part 15.

The screen display part 13 is formed of an LCD (Liquid Crystal Display) and a PDP (Plasma Display Panel), and has a function to display various kinds of information such as a manipulation menu on the screen in response to an instruction from the arithmetic processing part 15.

The storage part 14 is formed of a storage device such as a hard disk and a memory, and has a function to hold processing information necessary for various kinds of processing by the arithmetic processing part 15 and a program 14P. The program 14P is a program which is loaded into the arithmetic processing part 15 and executed to realize various kinds of processing parts, and is previously loaded from an external device (not shown in the drawings) or a storage medium (not shown in the drawings) via a data input and output function such as the communication I/F part 11 and the manipulation input part 12 and stored into the storage part 14. Major processing information stored in the storage part 14 are shared information 14A, a connection node list 14B, a type identifier 14C, and access restriction information 14D.

The shared information 14A is data shared with another node and is, for example, disaster information, traffic information and so on.

Figure 4:
FIG. 4 is a diagram showing an example of a connection node list stored in the wireless terminal according to the first exemplary embodiment of the present invention.

The connection node list 14B is a list of wireless terminals (nodes) allowed to connect. FIG. 4 shows an example of the configuration of the connection node list 14B. The connection node list 14B in this example has a plurality of entries each holding a combination of a node identifier and a MAC address of a wireless terminal allowed to connect.

The type identifier 14C is an identifier representing that a wireless terminal is not a universal terminal. The type identifier 14C is composed of a symbol, a letter, a number, and so on. There may be one kind of type identifier 14C, or there may be plural kinds, for example, two or three kinds of type identifiers 14C. Hereinafter, for the purpose of illustration, there is one kind of type identifier 14C and its content is expressed as "XXX."

Figure 5:
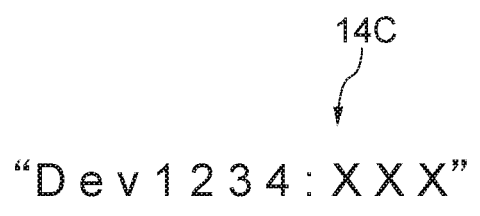

In this exemplary embodiment, for a dedicated terminal, the type identifier 14C is added to its terminal name (Device Name). FIG. 5 shows an example of the configuration of a terminal name of a wireless terminal to which the type identifier 14C is added. The portion of "Dev1234" is an identifier for uniquely identifying the wireless terminal, and the portion of "XXX" is a type identifier. On the other hand, in this exemplary embodiment, for a universal terminal, the type identifier 14C is not added to its terminal name.

In Wi-Fi Direct, Device Name described above is defined as one of the attributes added to a frame of Probe Request. Moreover, in Wi-Fi Direct, Device Name described above is defined as one of the components of Device Info Attribute. Device Info Attribute is included in a frame of, for example, Probe Response, Go Negotiation Request, Go Negotiation Response, and Provision Discovery Request. Therefore, by extracting the attribute value of Device Name from a frame of Probe Request, Probe Response, Go Negotiation Request, Go Negotiation Response or Provision Discovery Request received from another wireless terminal, and checking whether or not it contains an identifier consistent with the type identifier 14C, it is possible to determine whether or not the other wireless terminal is a universal terminal.

The access restriction information 14D is information about restriction on access to a resource of the wireless terminal 10 by another wireless terminal. The following can be considered as an example of the resource; an application program running on the terminal, specific hardware mounted on the terminal, and specific data stored in the terminal. In this exemplary embodiment, an application program is the target of the access restriction. Further, in this exemplary embodiment, as a method for restricting access to an application program, a method such as opening and closing a TCP or UDP communication port used by the application in a firewall is used. The access restriction information 14D holds a correspondence relation between information uniquely identifying another wireless terminal and the number of a communication port opened (or closed) for the wireless terminal.

Figure 6:
FIG. 6 is a diagram showing an example of access restriction information stored in the wireless terminal according to the first exemplary embodiment of the present invention.

FIG. 6 shows an example of the configuration of the access restriction information 14D. The access restriction information in this example has a plurality of entries each holding a combination of a service level, a list of communication port numbers allowed to connect, and a list of applied MAC addresses. The service level represents the degree of service provided for another wireless terminal being connected, and is an opposite idea of an access restriction level. On the list of communication port numbers allowed to connect, the number of a communication port to be opened among TCP and UDP communication ports is stored. For example, in a case where special communication, such as software update and execution of a command for maintenance (acquisition of a communication log, communication of a management command), is allowed at a service level 2 and is not allowed at a service level 1, the number of a communication port to perform the special communication (for example, No. 161 of Simple Network Management Protocol (SNMP)) is written on the list of communication port numbers at the service level 2 and is not written on the list of communication port numbers at the service level 1. On the list of applied MAC addresses, a MAC address of another wireless terminal to which the service level is applied is recorded. In the service level and the list of communication port numbers allowed to connect, desired data is recorded, for example, when the wireless terminal 10 is initialized. Meanwhile, on the list of applied MAC addresses, the MAC address of another wireless terminal is recorded dynamically while the wireless terminal 10 is operating. A MAC address written on the list of applied MAC addresses can be erased when connection with a wireless terminal having the MAC address is terminated, or can be kept held after the connection is terminated, or can be erased when a given time passes after the connection is terminated.

The arithmetic processing part 15 has a microprocessor such as an MPU and a peripheral circuit thereof and has a function to load the program 14P from the storage part, execute the program 14P and make the hardware described above and the program 14P work with each other to thereby realize various kinds of processing parts. Major processing parts realized by the arithmetic processing part 15 are a Wi-Fi connection control part 15A and an automatic connection control part 15B.

The Wi-Fi connection control part 15A is a block which generates a Wi-Fi Direct packet and sends it out through the wireless communication I/F part 11 and also receives a Wi-Fi Direct packet through the wireless communication I/F part 11. The Wi-Fi connection control part 15A executes control in a unit such as "Device Discovery," "Group Formation," "WPS (Wi-Fi Protected Setup) Provisioning Phase 1," and "WPS Provisioning Phase 2." Moreover, the Wi-Fi connection control part 15A receives an event (command) from the automatic connection control part 15B and starts control, and notifies the automatic connection control part 15B of its result as an event (response).

The automatic connection control part 15B is a control part located in the upper hierarchy of the Wi-Fi connection control part 15A. The automatic connection control part 15B controls the Wi-Fi connection control part 15A to realize Wi-Fi Direct automatic connection as shown in FIG. 2. To be specific, for example, when nodes come close to each other, they automatically form one group if the nodes are nodes to be connected and realize internode communication in the group. When a new node comes close to an already formed group, it automatically participates in the already formed group if they are nodes to be connected. The automatic connection control part 15B determines whether another node is a node to connect on the basis of whether or not the MAC address of the other terminal is consistent with any of the MAC addresses recorded on the connection node list 14B. Moreover, the automatic connection control part 15B, in Wi-Fi Direct connection, executes access control which differs in accordance with the type of a mobile object included by a connection destination wireless terminal. Therefore, the automatic connection control part 15B has a terminal type determination part 15C and an access control part 15D. Moreover, the automatic connection control part 15B has a function to, when connecting to a connection destination terminal and forming a P2P group with it, exchange the shared information 14A with each other.

The terminal type determination part 15C has a function to determine whether or not another wireless terminal is a universal terminal on the basis of information received from the wireless terminal before connecting to the wireless terminal. To be specific, the terminal type determination part 15C checks whether or not an identifier consistent with the type identifier 14C is contained in Device Name received from another wireless terminal, and determines that the wireless terminal is a universal terminal when such an identifier is not contained, whereas determines that the wireless terminal is a dedicated terminal when such an identifier is contained.

The access control part 15D has a firewall function. In order to control access to the resource of the wireless terminal 10 depending on the type of another wireless terminal, the access control part 15D registers the MAC address of the other wireless terminal to the access restriction information 14D. To be specific, the access control part 15D receives the MAC address of another wireless terminal and terminal type information whether or not the other wireless terminal is a universal terminal from the terminal type determination part 15C, and registers the MAC address of a universal terminal on the list of applied MAC addresses at the service level 1 of the access restriction information 14D, whereas registers the MAC address of a dedicated terminal on the list of applied MAC addresses at the service level 2.

Further, the access control part 15D refers to the access restriction information 14D and executes control of a TCP/UDP port in accordance with the type of another wireless terminal. To be specific, in wireless communication with another wireless terminal as a transmission source, the access control part 15D checks whether the MAC address of the transmission source is registered at the service level 1 or at the service level 2 of the access restriction information 14D. Then, for a transmission source registered at the service level 1, the access control part 15D opens only a port written on the list of communication port numbers to which connection of the service level 1 is allowed. For a transmission source registered at the service level 2, the access control part 15D opens only a port written on the list of communication port numbers to which connection of the service level 2 is allowed.

Hereinafter, the function of the automatic connection control part 15B will be described in more detail.

Figure 7:
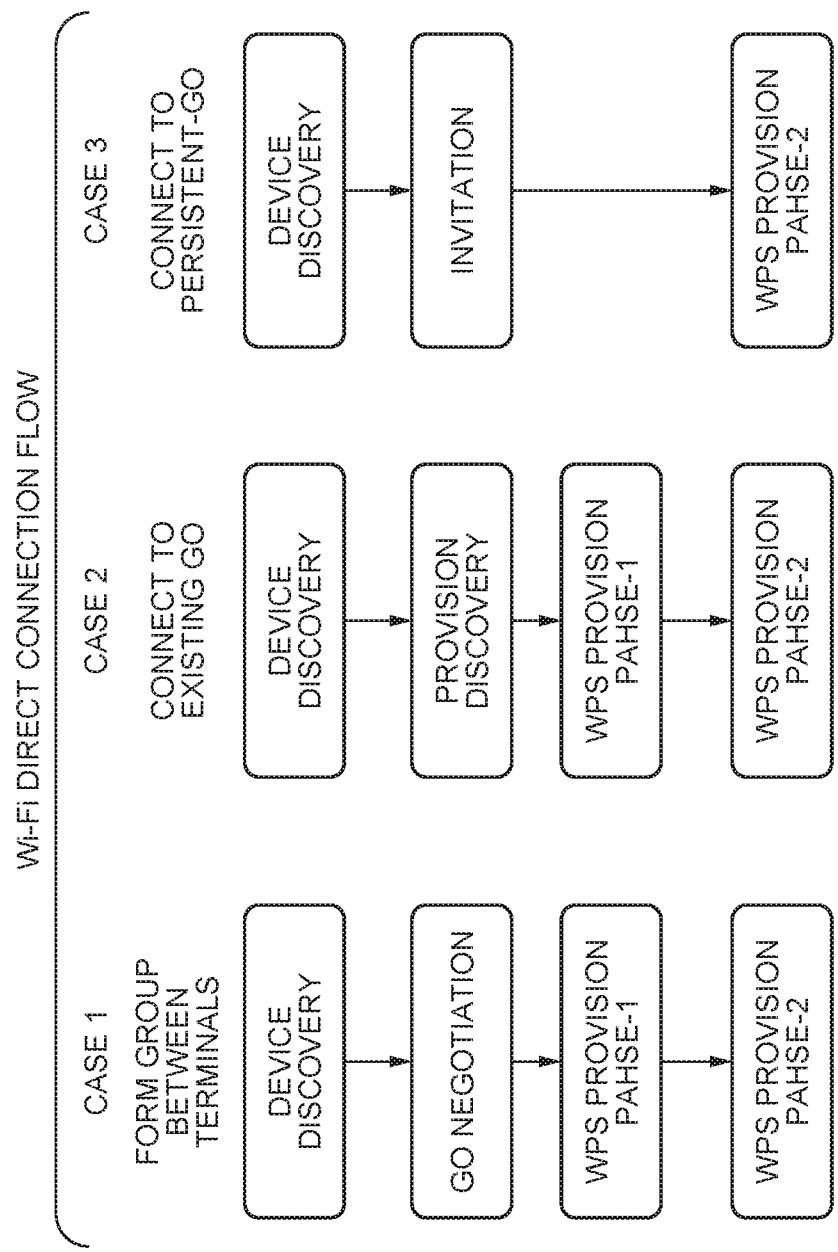
FIG. 7 is a diagram showing a connection flow of Wi-Fi Direct used in automatic connection by the wireless terminal according to the first exemplary embodiment of the present invention.

As shown in FIG. 7, in a case where an unconnected node forms a group with another unconnected node (CASE 1), the unconnected node first searches for a neighboring P2P node through Device Discovery processing and, when discovering such a P2P node, one of the nodes becomes a group owner (GO) and the other becomes a client through GO Negotiation processing, and the nodes connect to each other. Subsequently, WPS Provision Phase-1 (an authentication phase) and WPS Provision Phase-2 (an encryption phase) are sequentially executed.

Thus, in CASE 1 where Device Discovery processing and GO Negotiation processing are executed, the terminal type determination part 15C of the wireless terminal 10 can determine whether or not the other wireless terminal 20, 30, 40 is a universal terminal, for example, by checking whether or not an identifier consistent with the type identifier 14C is contained in Device Name included in Probe Request or Probe Response received from the other wireless terminal 20, 30, 40. Alternatively, the terminal type determination part 15C of the wireless terminal 10 can determine whether or not the other wireless terminal 20, 30, 40 is a universal terminal, for example, by checking whether or not an identifier consistent with the type identifier 14C is contained in Device Name included in GO Negotiation Request or GO Negotiation Response received from the other wireless terminal 20, 30, 40.

As shown in FIG. 7, in a case where an unconnected node connects to an existing GO (CASE 2), the unconnected node first searches for a neighboring P2P node through Device Discovery processing and, when the discovered P2P node is GO, connects to the GO through Provision Discovery processing, and subsequently, WPS Provision Phase-1 (the authentication phase) and WPS Provision Phase-2 (the encryption phase) are sequentially executed.

Thus, in CASE 2 where Device Discovery processing and Provision Discovery processing are executed, when the wireless terminal 10 is GO, the terminal type determination part 15C of the wireless terminal 10 can determine whether or not the other wireless terminal 20, 30, 40 is a universal terminal, for example, by checking whether or not an identifier consistent with the type identifier 14C is contained in Device Name included in Provision Discovery Request received from the other wireless terminal 20, 30, 40. On the other hand, when the wireless terminal 10 is an unconnected node, the terminal type determination part 15C of the wireless terminal 10 can determine whether or not the other wireless terminal 20, 30, 40 is a universal terminal, for example, by checking whether or not an identifier consistent with the type identifier 14C is contained in Device Name included in Probe Response received from the other wireless terminal 20, 30, 40 serving as GO.

As shown in FIG. 7, in a case where an unconnected node connects to a Persistent GO (CASE 3), the unconnected node first searches for a neighboring P2P node through Device Discovery processing and, when the discovered P2P node is a Persistent GO, connects to the Persistent GO through Invitation processing, and subsequently, WPS Provision Phase-2 (the encryption phase) is executed.

In CASE 3, because Credential information is stored, WPS Provision Phase-1 (the authentication phase) is omitted. Therefore, by storing type information of a mobile object provided with another wireless terminal determined in the last connection together with Credential information, it is possible to determine the type of the mobile object equipped with the wireless terminal. Alternatively, the list of applied MAC addresses shown in FIG. 6 may be stored for the same time period as Credential information. Alternatively, in CASE 3, because Device Discovery Processing is executed, the terminal type determination part 15C of the wireless terminal 10 can determine whether or not the other wireless terminal 20, 30, 40 is a universal terminal, for example, by checking whether or not an identifier consistent with the type identifier 14C is contained in Device Name included in Probe Request or Probe Response received from the other wireless terminal 20, 30, 40.

Figure 8:
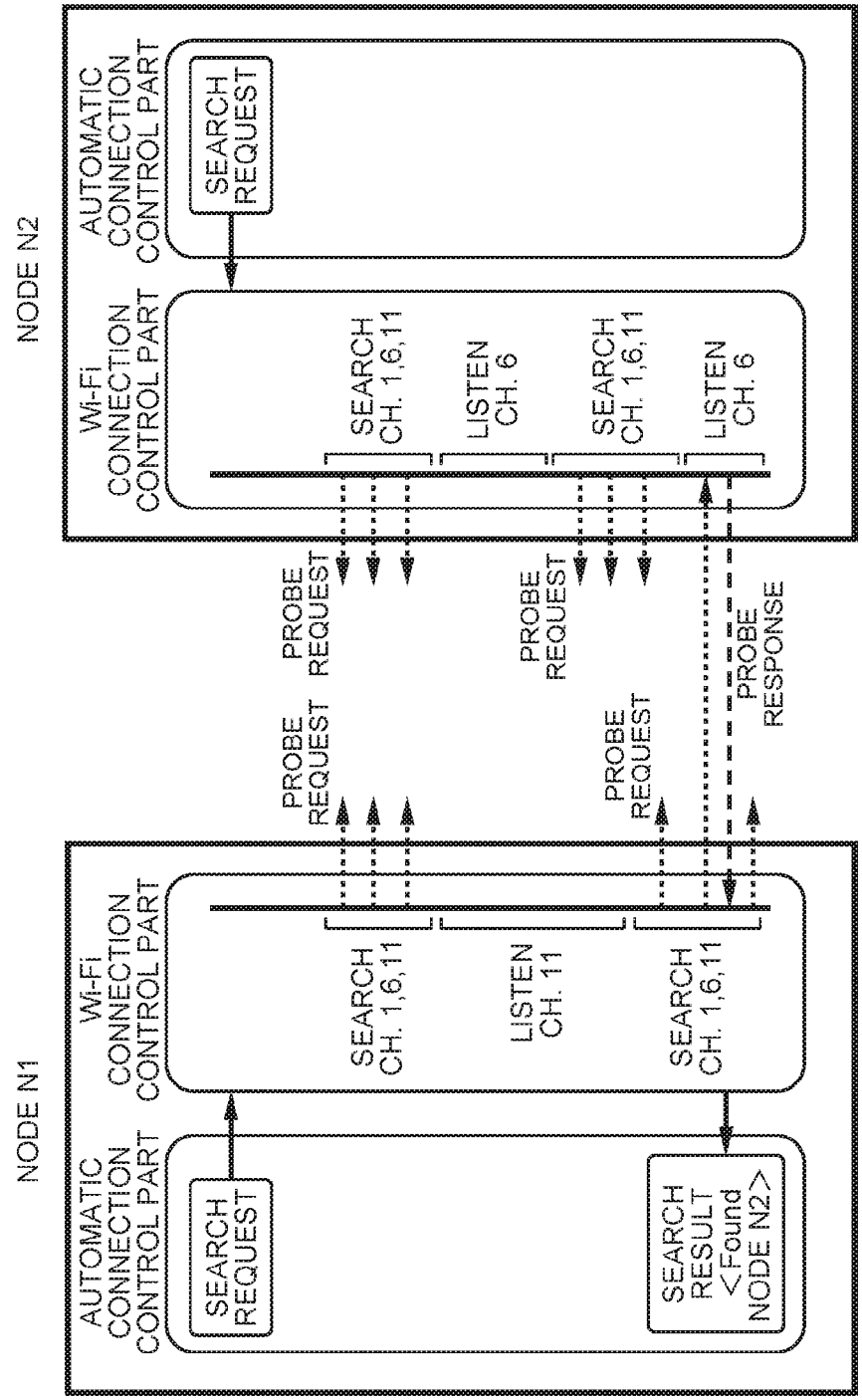
FIG. 8 is a diagram showing an operation flow of DEVICE DISCOVERY used in device discovery by the wireless terminal according to the first exemplary embodiment of the present invention.

A Device Discovery operation is performed as exemplified in FIG. 8. That is to say, the Wi-Fi connection control part of each node, when receiving a search request from the automatic connection control part, starts to search for a neighboring node and alternately switches between a Search state and a Listen state. In the Search state, the Wi-Fi connection control part of each node sends out a Probe Request while sequentially switching given channels and waits for a Probe Response that is a response to the Probe Request. In the Listen state, the Wi-Fi connection control part waits for a Probe Request from another node and, when receiving a Probe Request, returns a Probe Response in response to the Probe Request. In a case where a node N1 is a client of a group, when receiving a Probe Response from a node N2, the Wi-Fi connection control part of the node N1 notifies information of the neighboring node N2 as neighboring node information to a group owner of the group.

Figure 9:
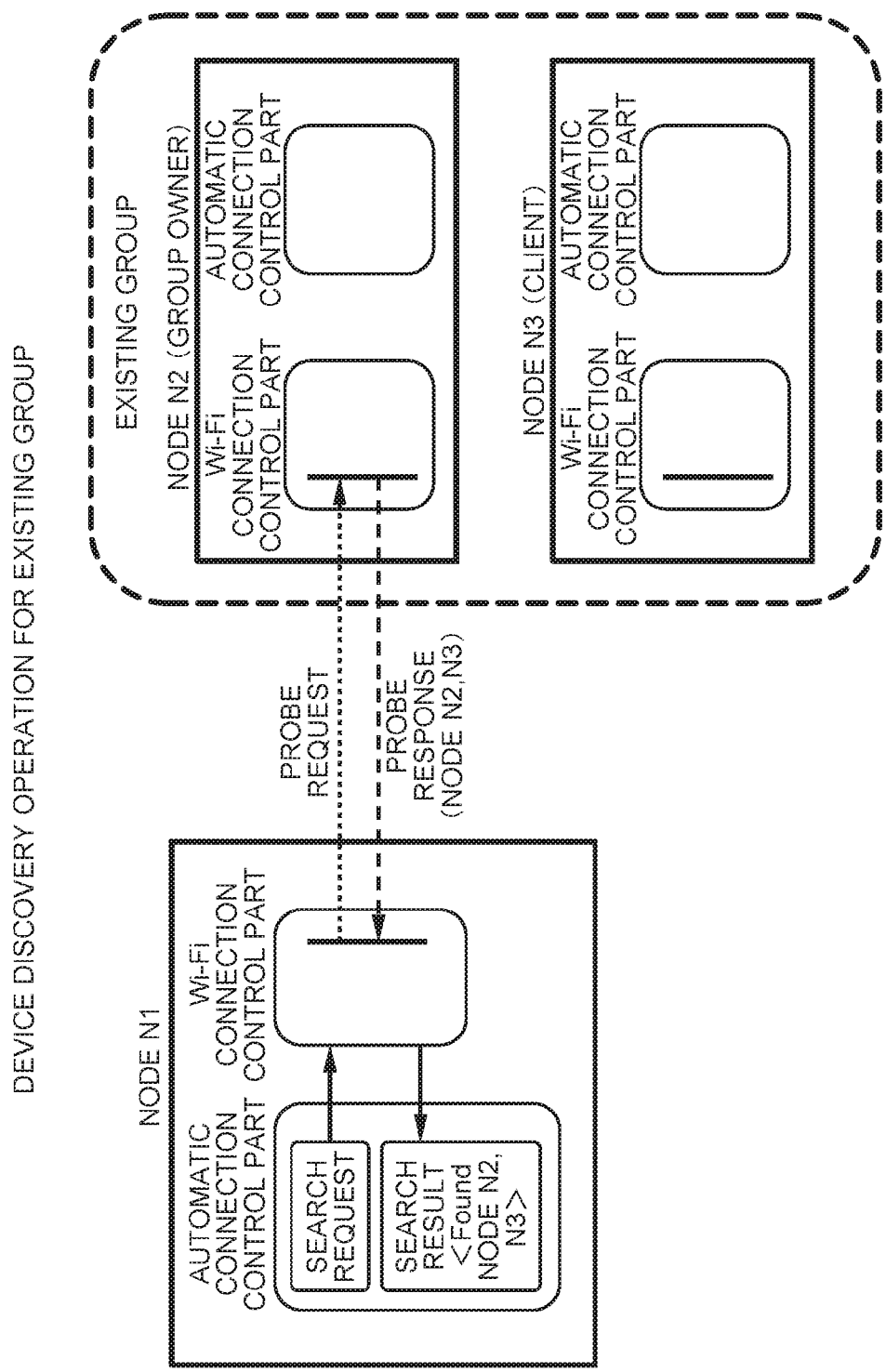
FIG. 9 is a diagram showing an operation flow of DEVICE DISCOVERY used in existing group discovery by the wireless terminal according to the first exemplary embodiment of the present invention.

A Device Discovery operation for an existing GO is performed as exemplified in FIG. 9. In a case where a group with the node 2 as a group owner is already structured, the GO node N2 returns a Probe Response in response to a Probe Request from the node N1. In this case, a P2P Device Info Attribute of the Probe Response from the GO node N2 includes a list of clients belonging to the group (herein, information of the node N2 and a node N3).

Figure 10:
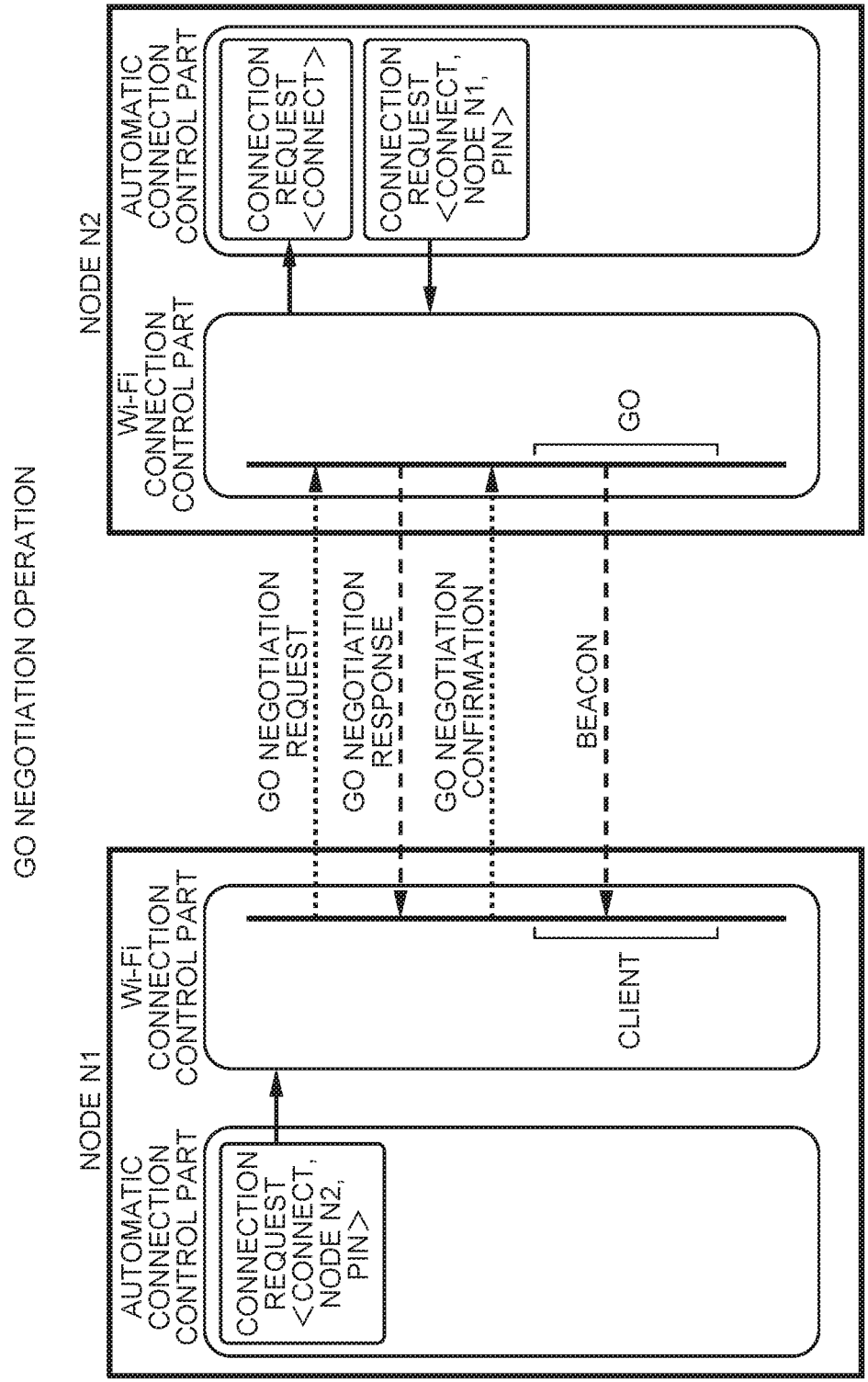
FIG. 10 is a diagram showing an operation flow of GO NEGOTIATION used in automatic connection by the wireless terminal according to the first exemplary embodiment of the present invention.

A GO Negotiation operation when terminals form a group is performed as exemplified in FIG. 10. A GO Negotiation Request, a GO Negotiation Response, and a GO Negotiation Confirmation are exchanged between the nodes, whereby one of the nodes becomes a GO and starts to broadcast a beacon.

Figure 11:
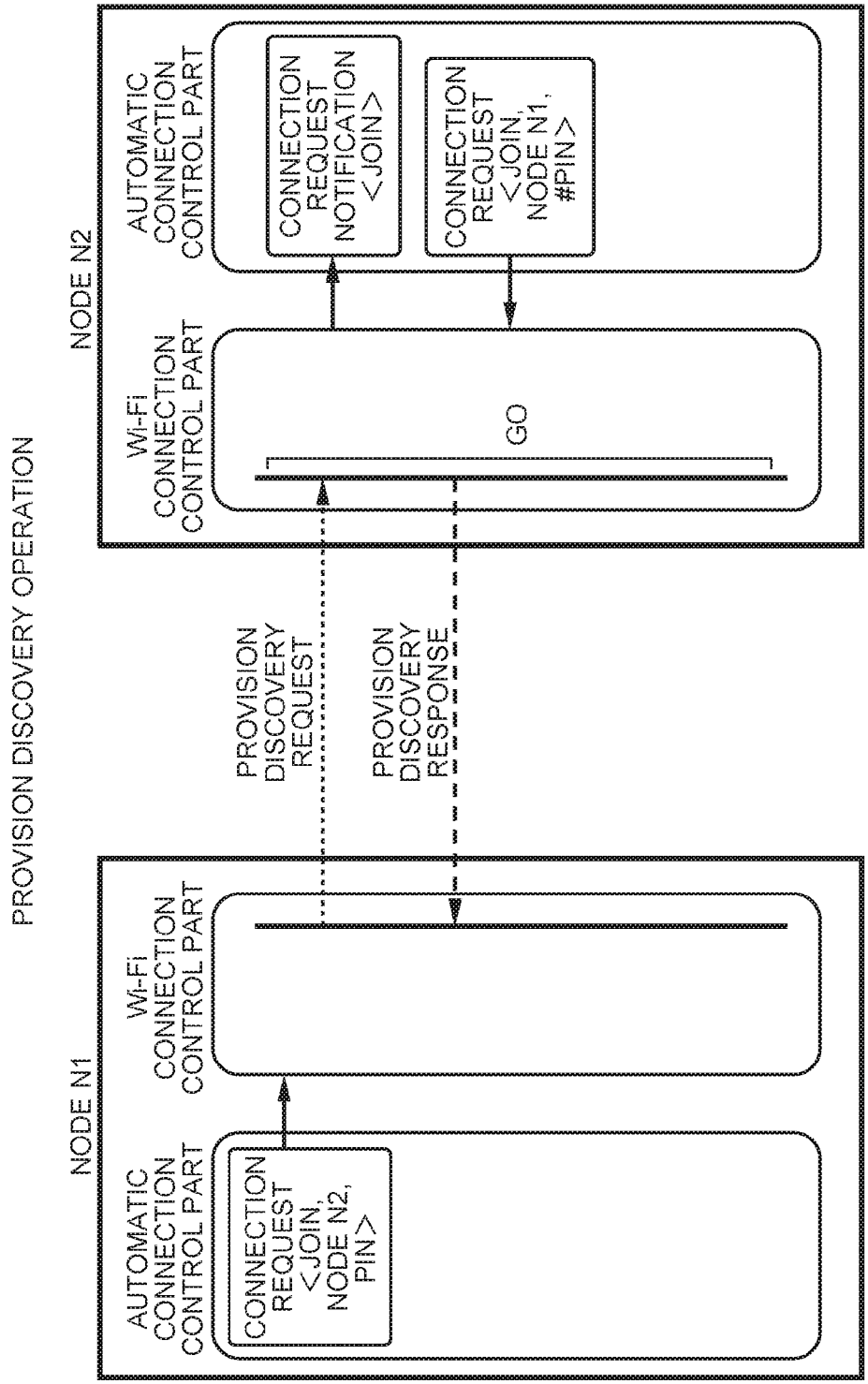
FIG. 11 is a diagram showing an operation flow of PROVISION DISCOVERY used in automatic connection by the wireless terminal according to the first exemplary embodiment of the present invention.

A Provision Discovery operation for connecting to an existing GO is performed as exemplified in FIG. 11. In response to a Provision Discovery Request to the node N2 by the node N1, the GO node N2 returns a Provision Discovery Response to the node N1, whereby the node N1 is connected to the node N2.

Figure 12:
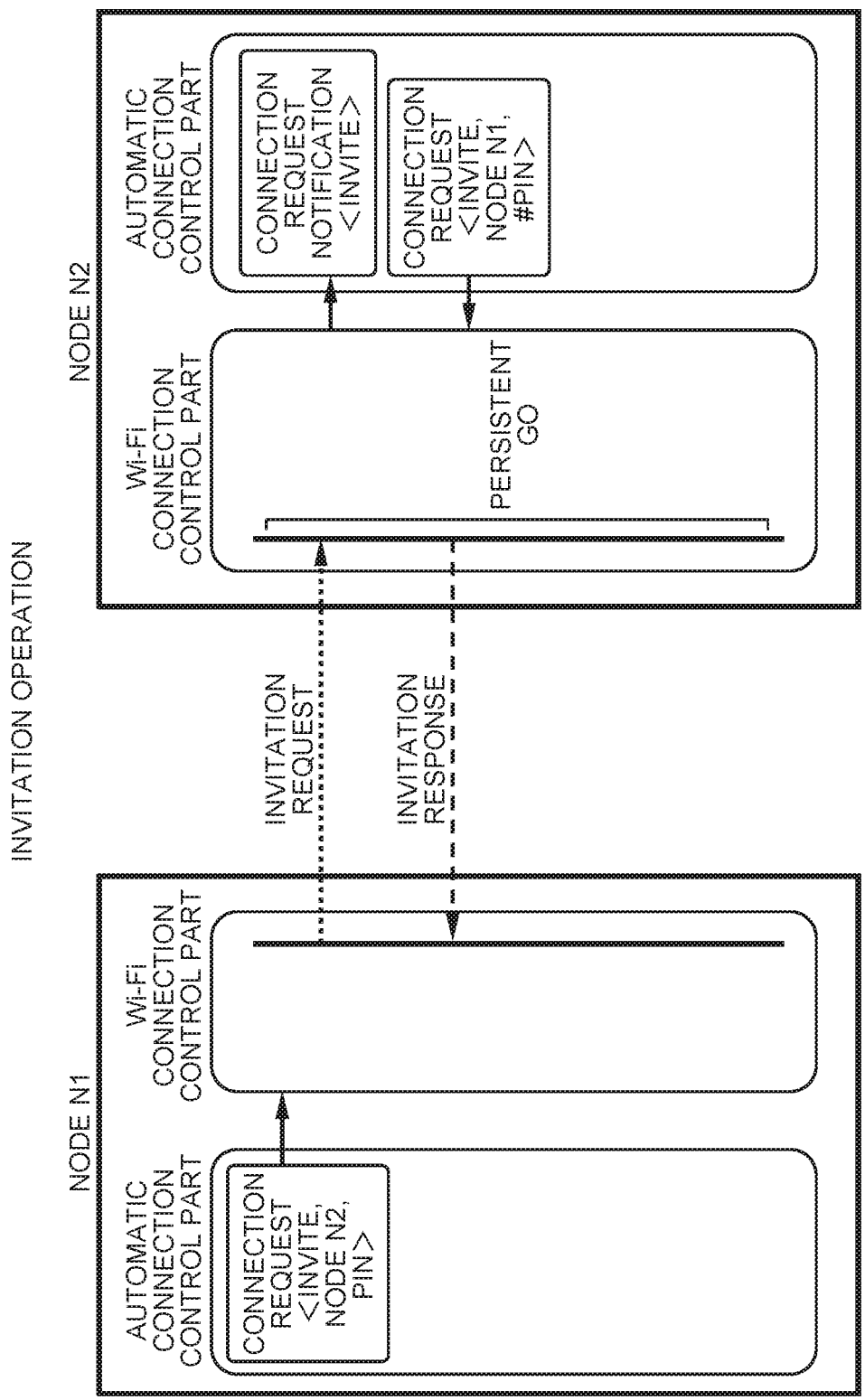
FIG. 12 is a diagram showing an operation flow of INVITATION used in automatic connection by the wireless terminal according to the first exemplary embodiment of the present invention.

An Invitation operation for connecting to a Persistent-GO is performed as exemplified in FIG. 12. In response to an Invitation Request to the node N2 by the node N1, the Persistent-GO node N2 returns an Invitation Response to the node N1, whereby the node N1 is connected to the node N2.

Figure 13:
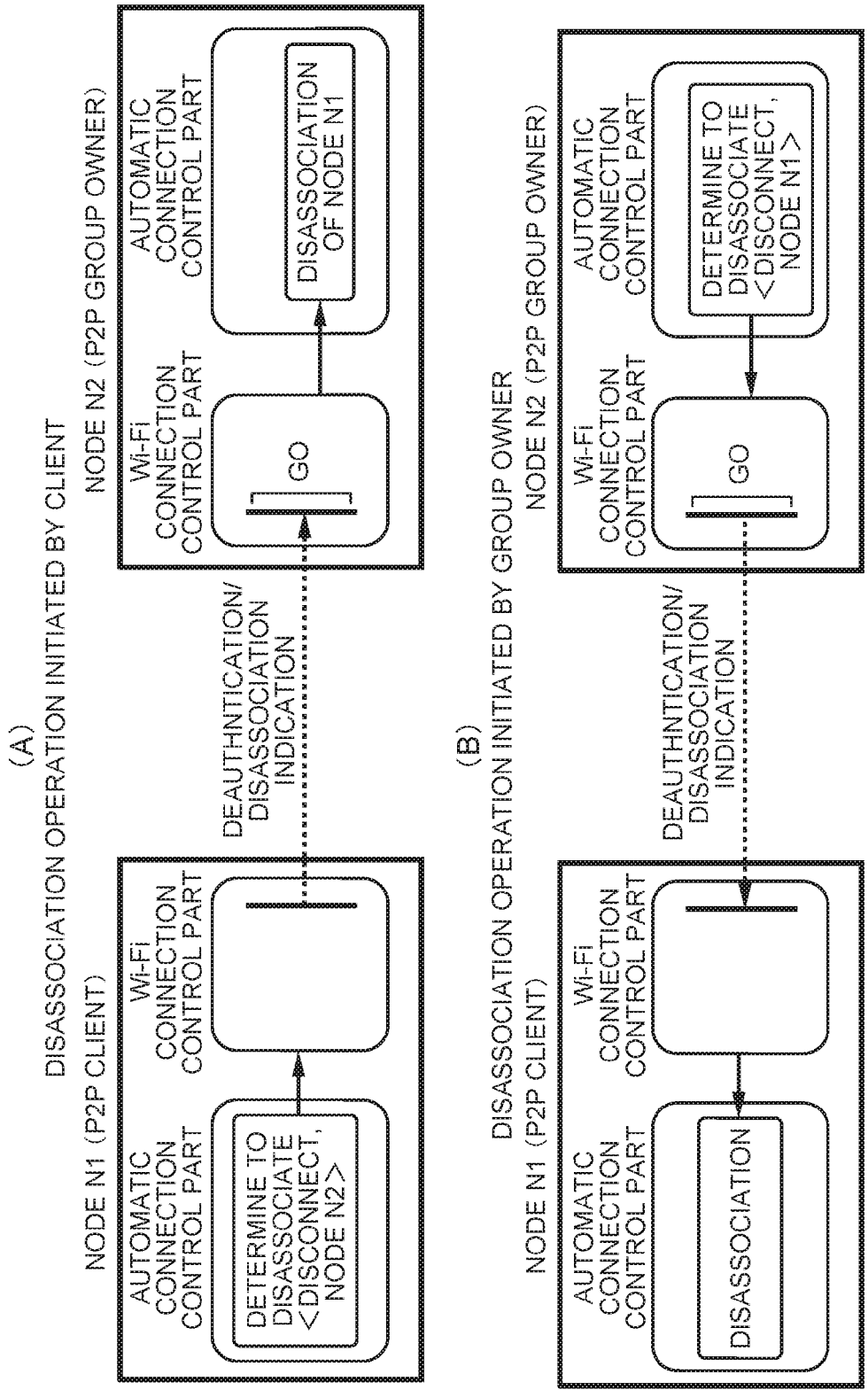
FIG. 13 is a diagram showing an operation flow of node departure used in automatic connection by the wireless terminal according to the first exemplary embodiment of the present invention.

In disassociation initiated by a client, it is possible to disassociate a client in manner that the client node N1 transmits Deauthentication or Disassociation Indication to the GO node N2 as shown in FIG. 13. On the contrary, in disassociation initiated by a group owner, it is possible to disassociate a client in a manner that the GO node N2 transmits Deauthentication or Disassociation Indication to the client node N1 as shown in FIG. 13.

[Second Exemplary Embodiment]

In the first exemplary embodiment, the wireless terminal 10 determines whether or not another wireless terminal is a universal terminal on the basis of whether or not an identifier consistent with the type identifier 14C is contained in a frame received from the other wireless terminal. Meanwhile, a wireless terminal according to this exemplary embodiment determines whether or not another wireless terminal is a universal terminal on the basis of information of an authentication method received from the other wireless terminal.

The Wi-Fi Direct WPS supports two authentication methods; the PIN (Personal Identification Number) method and the PBC (Push Button Control) method. The PIN method is a method of authenticating each other by using an eight digit number as a password. On the other hand, the push button method is a method of authenticating a connection destination by pushing a push button within a given time period. The push button method is appropriate as an authentication method for a universal terminal such as a smartphone because it does not need input of a password. On the other hand, for a wireless terminal provided in a vehicle and the like, authentication by the PIN method is appropriate in order to increase security. Thus, a general wireless terminal such as a smartphone tends to request a connection destination to authenticate by the push button method, and a wireless terminal provided in a vehicle and the like tends to request a connection destination to authenticate by the PIN method for higher security. This point is noted in this exemplary embodiment, and a wireless terminal which requests the push button method is determined as a universal terminal, whereas a wireless terminal which requests the PIN method is determined as a dedicated terminal.

Figure 14:
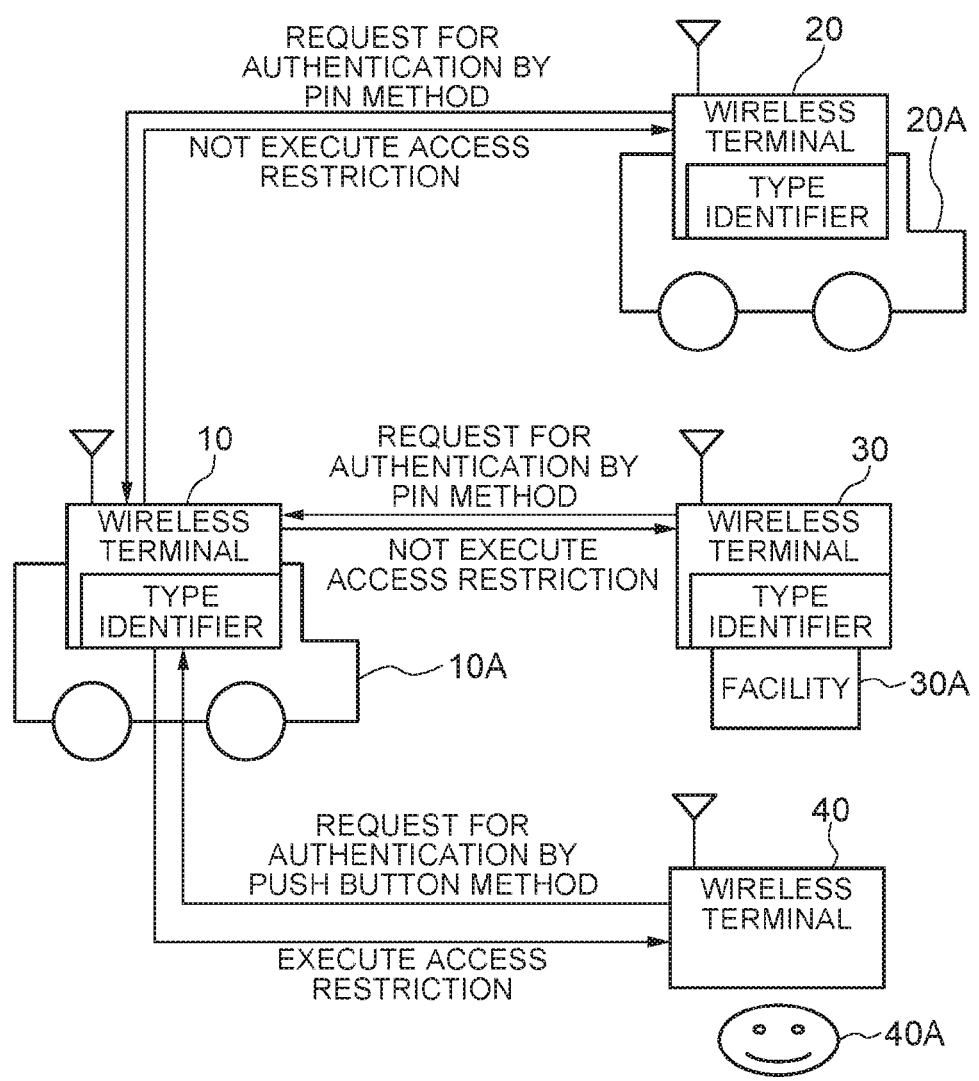
FIG. 14 is a block diagram of a communication system according to a second exemplary embodiment of the present invention.

FIG. 14 is a block diagram showing a communication system according to this exemplary embodiment, and the same part as in FIG. 1 is denoted by the same reference numeral. In the case of establishing a wireless connection with the wireless terminal 20, 30, the wireless terminal 10 receives information on a request for authentication by the PIN method from the wireless terminal 20, 30 and thereby determines that the wireless terminal 20, 30 is not a universal terminal and, after establishing a connection, does not restrict access to the resource in the wireless terminal 10 by the wireless terminal 20, 30. On the other hand, in the case of establishing a wireless connection with the wireless terminal 40 shown in FIG. 14, the wireless terminal 10 receives information on a request for authentication by the push button method and thereby determines that the wireless terminal 40 is a universal terminal and, after establishing a connection, restricts access to the resource in the wireless terminal 10 by the wireless terminal 40.

Figure 15:
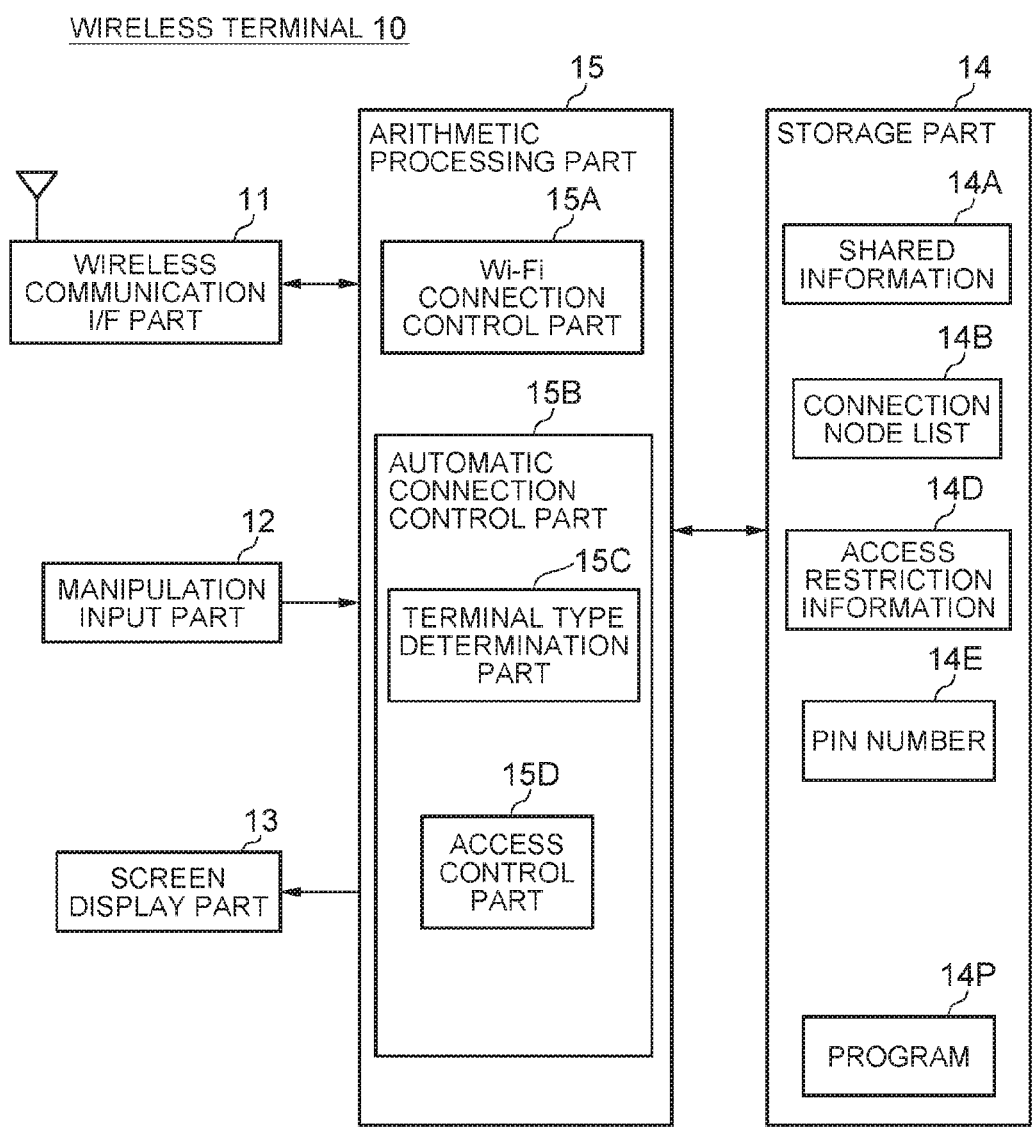
FIG. 15 is a block diagram of a wireless terminal according to the second exemplary embodiment of the present invention.

FIG. 15 is a block diagram showing an example of the configuration of the wireless terminal 10 according to this exemplary embodiment, and the same part as in FIG. 3 is denoted by the same reference numeral. When the wireless terminal 10 shown in FIG. 15 is requested by a destination wireless terminal to which it intends connect to authenticate by the push button method, the terminal type determination part 15C of the wireless terminal 10 determines that the destination wireless terminal is a universal terminal. On the other hand, when the wireless terminal 10 is requested by a destination wireless terminal to authenticate by the PIN method, the terminal type determination part 15C determines that the destination wireless terminal is a dedicated terminal. The automatic connection control part 15B performs authentication by using an authentication method requested by a destination wireless terminal. In authentication by the PIN method, a PIN number 14E previously stored in the storage part 14 is used. Except for the above, the configuration and operation of the wireless terminal 10 are the same as those of the terminal 10 shown in FIG. 3.

Thus, according to this exemplary embodiment, the wireless terminal 10 can determine whether or not another wireless terminal to which it intends to connect is a universal terminal depending on whether an authentication method requested by the other wireless terminal is the push button method or the PIN method, and execute difference access controls depending on the determined type of the mobile object.

[Third Exemplary Embodiment]

In the second exemplary embodiment, the wireless terminal 10 determines whether or not another wireless terminal to connect is a universal terminal depending on whether an authentication method requested by the other wireless terminal is the push-button method or the PIN method. Meanwhile, in this exemplary embodiment, both a pedestrian and a mobile object other than a pedestrian performs authentication by the PIN method, and a PIN number used in authentication of a universal terminal is different from that of a wireless terminal other than the universal terminal, namely, a desiccated terminal. Then, the wireless terminal 10 determines whether another terminal is a universal terminal based on the difference in PIN numbers.

Figure 16:
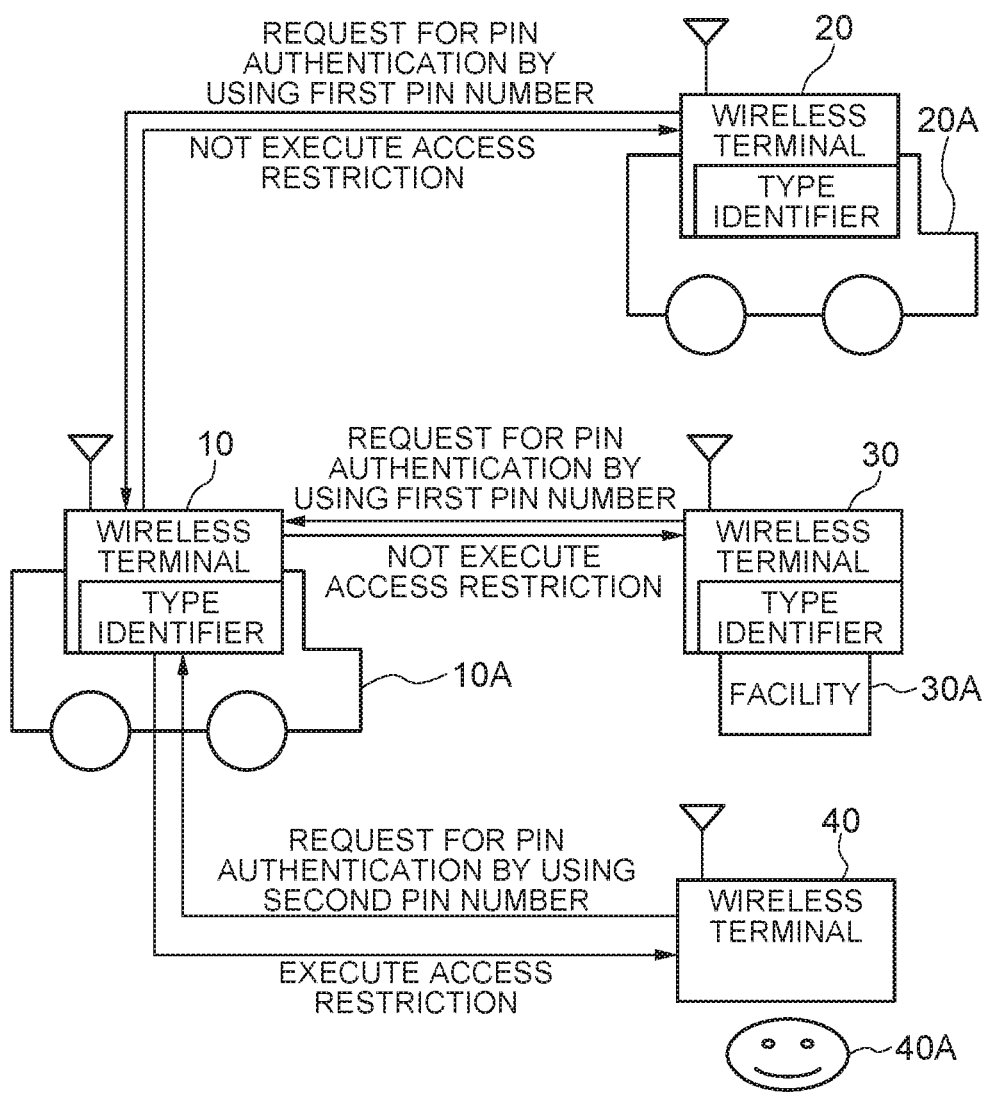
FIG. 16 is a block diagram of a communication system according to a third exemplary embodiment of the present invention.

FIG. 16 is a block diagram showing a communication system according to this exemplary embodiment, and the same part as in FIG. 1 is denoted by the same reference numeral. In the case of establishing a wireless connection with the wireless terminal 20, 30, the wireless terminal 10 receives information on PIN authentication by using a first PIN number from the wireless terminal 20, 30 and thereby determines that the wireless terminal 20, 30 is not a universal terminal and, after establishing a connection, does not restrict access to the resource in the wireless terminal 10 from the wireless terminal 20, 30. On the other hand, in the case of establishing a wireless connection with the wireless terminal 40 shown in FIG. 16, the wireless terminal 10 receives information on PIN authentication by using a second PIN number from the wireless terminal 40 and thereby determines that the wireless terminal 40 is a universal terminal and, after establishing a connection, restricts access to the resource in the wireless terminal 10 from the wireless terminal 40.

Figure 17:
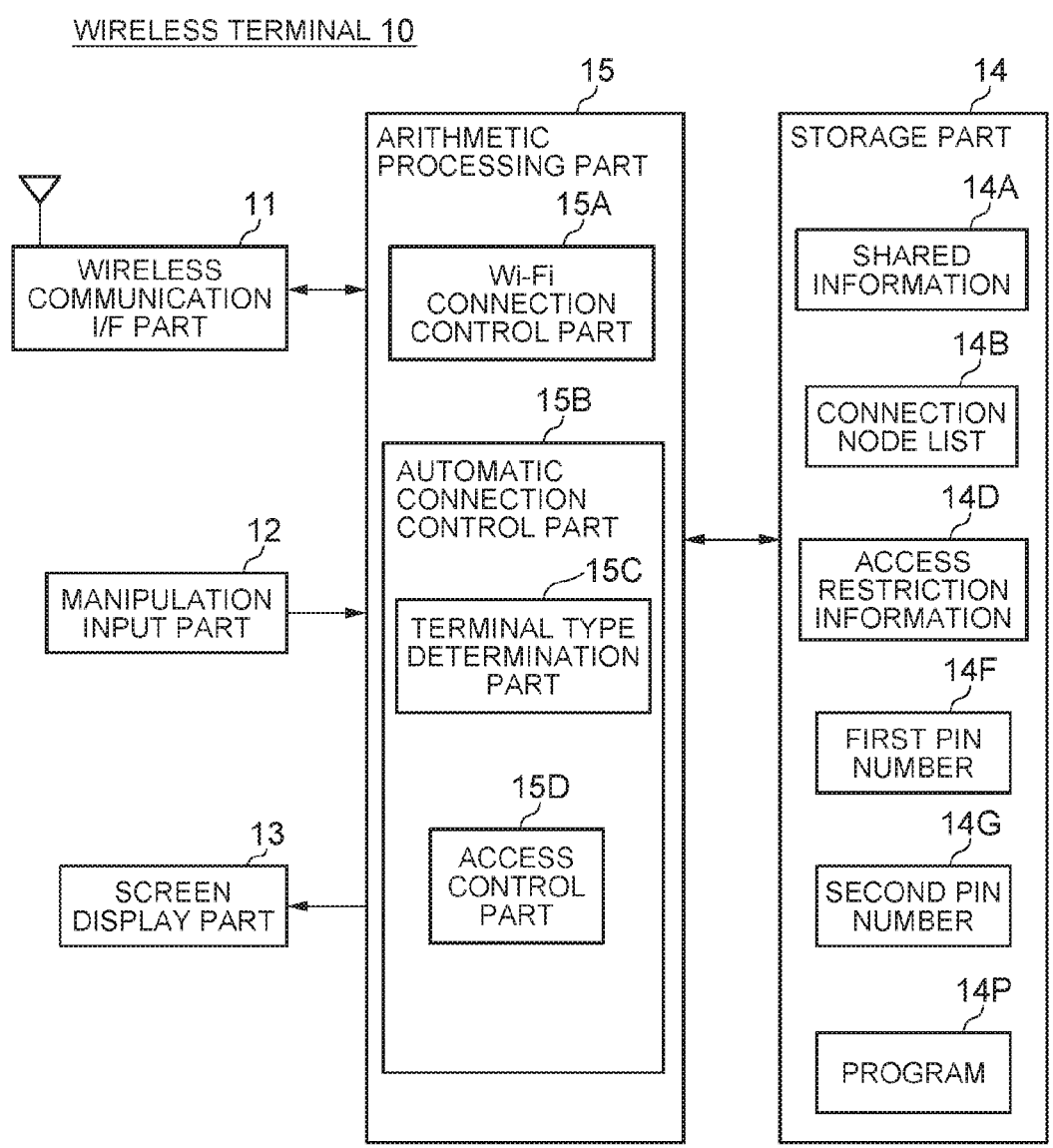
FIG. 17 is a block diagram of a wireless terminal according to the third exemplary embodiment of the present invention.

FIG. 17 is a block diagram showing an example of the configuration of the wireless terminal 10 according to this exemplary embodiment, and the same part as in FIG. 3 is denoted by the same reference numeral. When the wireless terminal 10 shown in FIG. 17 is requested by a destination wireless terminal to which it intends to connect to perform PIN authentication by using the second PIN number, the terminal type determination part 15C of the wireless terminal 10 determines that the destination wireless terminal is a universal terminal. On the other hand, when the wireless terminal 10 is requested by a destination wireless terminal to perform PIN authentication by using the first PIN number, the terminal type determination part 15C determines that the destination wireless terminal is a dedicated terminal. The automatic connection control part 15B performs PIN authentication with a destination wireless terminal. In authentication, a first PIN number 14F and a second PIN number 14G previously stored in the storage part 14 are properly used. That is to say, the automatic connection control part 15B performs authentication by using the first PIN number 14F when authentication by using the first PIN number is requested by a destination terminal, and the automatic connection control part 15B performs authentication by using the second PIN number 14G when authentication by using the second PIN number is requested by a destination terminal. On the other hand, in a case where the wireless terminal 10 requests a destination terminal to perform authentication, first, requests the destination terminal to perform PIN authentication by using the first PIN number and, if fails in authentication, switches to PIN authentication by using the second PIN number and requests the partner terminal to perform authentication again.

Thus, according to this exemplary embodiment, the wireless terminal 10 can determine whether or not another wireless terminal to which it intends to connect is a universal terminal depending on a difference in a PIN number received from the other wireless terminal, and execute different access controls depending on the determined type of the mobile object.

[Fourth Exemplary Embodiment]

In the first exemplary embodiment, the wireless terminal 10 restricts access by controlling a TCP/UDP port depending on whether or not another wireless terminal is a universal terminal. Meanwhile, in this exemplary embodiment, by preparing a plurality of application programs which execute different processing as applications using one TCP/UDP port and changing an application program to start depending on whether or not another wireless terminal is a universal terminal, access is controlled depending on whether or not the other wireless terminal is a universal terminal.

Figure 18:
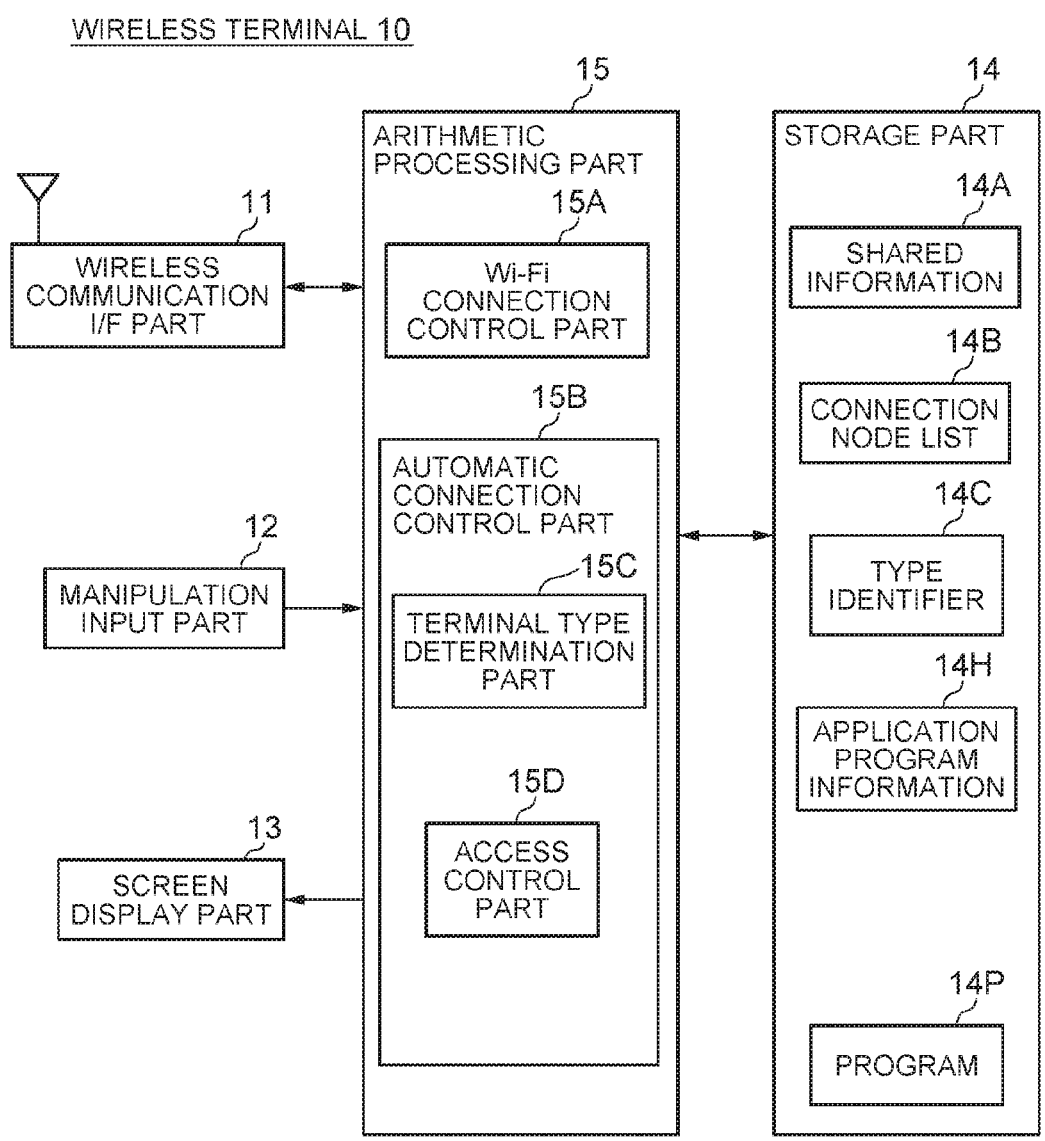
FIG. 18 is a block diagram of a wireless terminal according to a fourth exemplary embodiment of the present invention.

FIG. 18 is a block diagram showing an example of the configuration of the wireless terminal 10 according to this exemplary embodiment, and the same part as in FIG. 3 is denoted by the same reference numeral. In the storage part 14 of the wireless terminal 10 shown in FIG. 18, application program information 14H representing a plurality of application programs which execute different processing is stored as applications using one TCP/UDP port.

Figure 19:
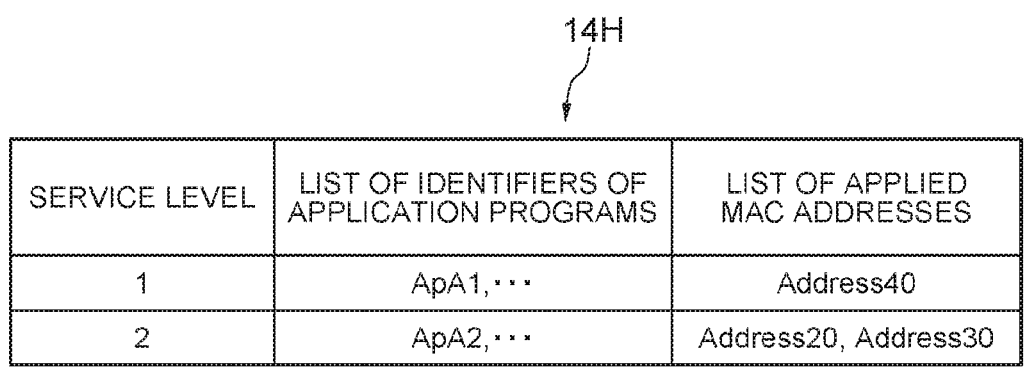
FIG. 19 is a diagram showing an example of application program information stored in the wireless terminal according to the fourth exemplary embodiment of the present invention.

FIG. 19 shows an example of the configuration of the application program information 14H. The application program information 14H in this example includes a plurality of entries each holding a combination of a service level, a list of application programs to start and a list of applied MAC addresses. On the list of application programs to start, an identifier of an application program providing a service is stored. On the list of applied MAC addresses, the MAC address of another wireless terminal to which the service level is applied. In the service level and the list of application programs to start, desired data is recorded, for example, at the time of initialization of the wireless terminal 10. In FIG. 19, an application program ApA1 is recorded at a service level 1, and an application program ApA2 is recorded at a service level 2. The application programs ApA1 and ApA2 use the same TCP/UDP port. The application program ApA1 does not have a function to provide all or part of the service provided by the application program ApA2.

The access control part 15D of the wireless terminal 10 receives the MAC address of another wireless terminal and terminal type information whether or not the other wireless terminal is a universal terminal from the terminal type determination part 15C, and registers the MAC address of a universal terminal on the list of applied MAC addresses of the service level 1 of the application program information 14H, whereas registers the MAC address of a dedicated terminal on the list of applied MAC addresses of the service level 2.

Further, with reference to the application program information 14H, the access control part 15D changes an application program providing a service depending on whether or not another wireless terminal is a universal terminal. To be specific, in wireless communication with another wireless terminal as a transmission source, the access control part 15D checks whether the MAC address of the transmission source is registered at the service level 1 or at the service level 2 of the application program information 14H. For a transmission source registered at the service level 1, the access control part 15D starts an application program written on the list of application programs of the service level 1. On the other hand, for a transmission source registered at the service level 2, the access control part 15D starts an application program written on the list of the service level 2. In either case, a port to use is opened.

[Fifth Exemplary Embodiment]

An exemplary embodiment in which a maximum connection time of a wireless LAN is changed depending on whether or not a connection destination wireless terminal is a universal terminal will be described below.

Figure 20:
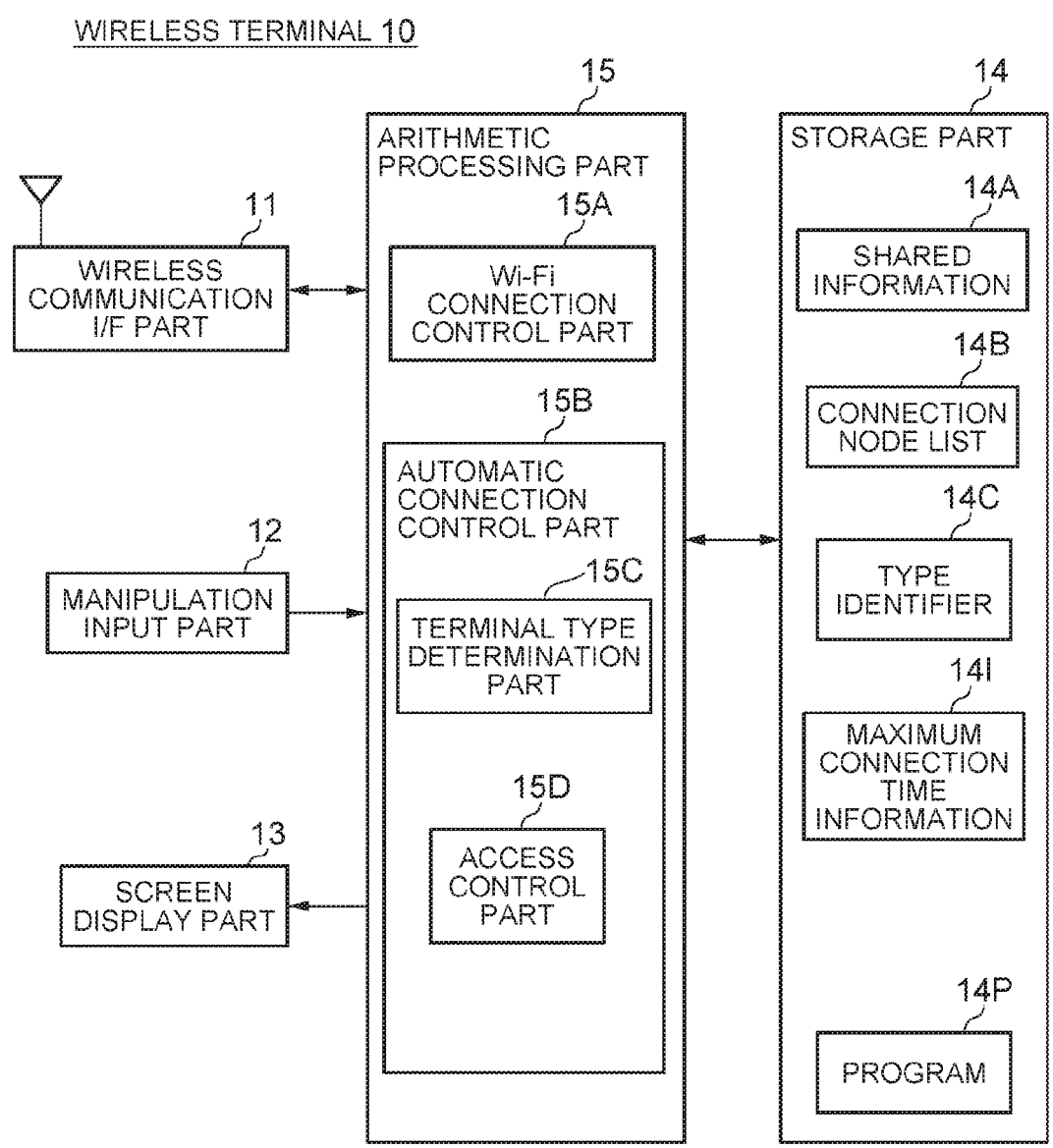
FIG. 20 is a block diagram of a wireless terminal according to a fifth exemplary embodiment of the present invention.

FIG. 20 is a block diagram showing an example of the configuration of the wireless terminal 10 according to this exemplary embodiment, and the same part as in FIG. 3 is denoted by the same reference numeral. In the storage part 14 of the wireless terminal 10 shown in FIG. 20, maximum connection time information 14I is stored.

Figure 21:
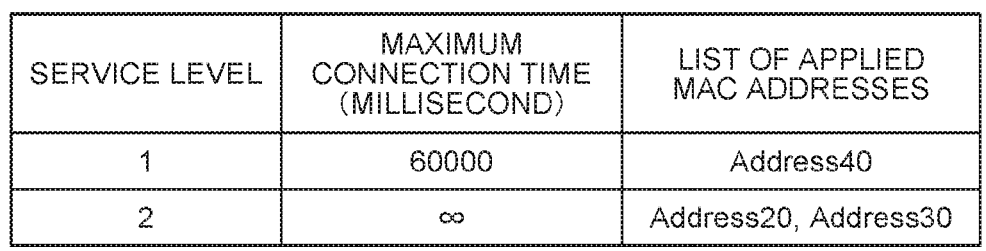
FIG. 21 is a diagram showing an example of maximum connection time information stored in the wireless terminal according to the fifth exemplary embodiment of the present invention.

FIG. 21 shows an example of the configuration of the maximum connection time information 14I. The maximum connection time 14I in this example includes a plurality of entries each holding a combination of a service level, a maximum connection time and a list of applied MAC addresses. In the maximum connection time, a maximum allowable time from success in authentication and establishment of connection to termination of the connection is stored. On the list of applied MAC addresses, the MAC address of another wireless terminal to which the service level is applied is stored. In the service level and the maximum connection time, desired data is stored, for example, at the time of initialization of the wireless terminal 10. In FIG. 21, a maximum connection time of 60000 milliseconds is recorded at the service level 1, and a symbol representing an unlimited maximum connection time is recorded at the service level 2.

The access control part 15D of the wireless terminal 10 receives the MAC address of another wireless terminal and terminal type information representing whether or not the other wireless terminal is a universal terminal from the terminal type determination part 15C, and registers the MAC address of a universal terminal on the list of applied MAC addresses of the service level 1 of the maximum connection time information 14I, whereas registers the MAC address of a dedicated terminal on the list of applied MAC addresses of the service level 2.

Further, with reference to the maximum connection time information 14I, the access control part 15D controls a connection time depending on whether or not another wireless terminal is a universal terminal. To be specific, the access control part 15D checks whether the MAC address of another wireless terminal is registered at the service level 1 or in the service level 2 of the maximum connection time information 14I. For a wireless terminal registered at the service level 1, after connection is established, the access control part 15D automatically terminates the connection after the maximum connection time of the service level 1 passes. On the other hand, for a wireless terminal registered at the service level 2, the access control part 15D does not perform disconnection due to timeout of the maximum connection time. Consequently, unauthorized use such as cracking by a universal terminal is prevented.

[Sixth Exemplary Embodiment]

An exemplary embodiment in which a maximum idle time of a wireless LAN is changed depending on whether or not a connection destination wireless terminal is a universal terminal will be described below.

Figure 22:
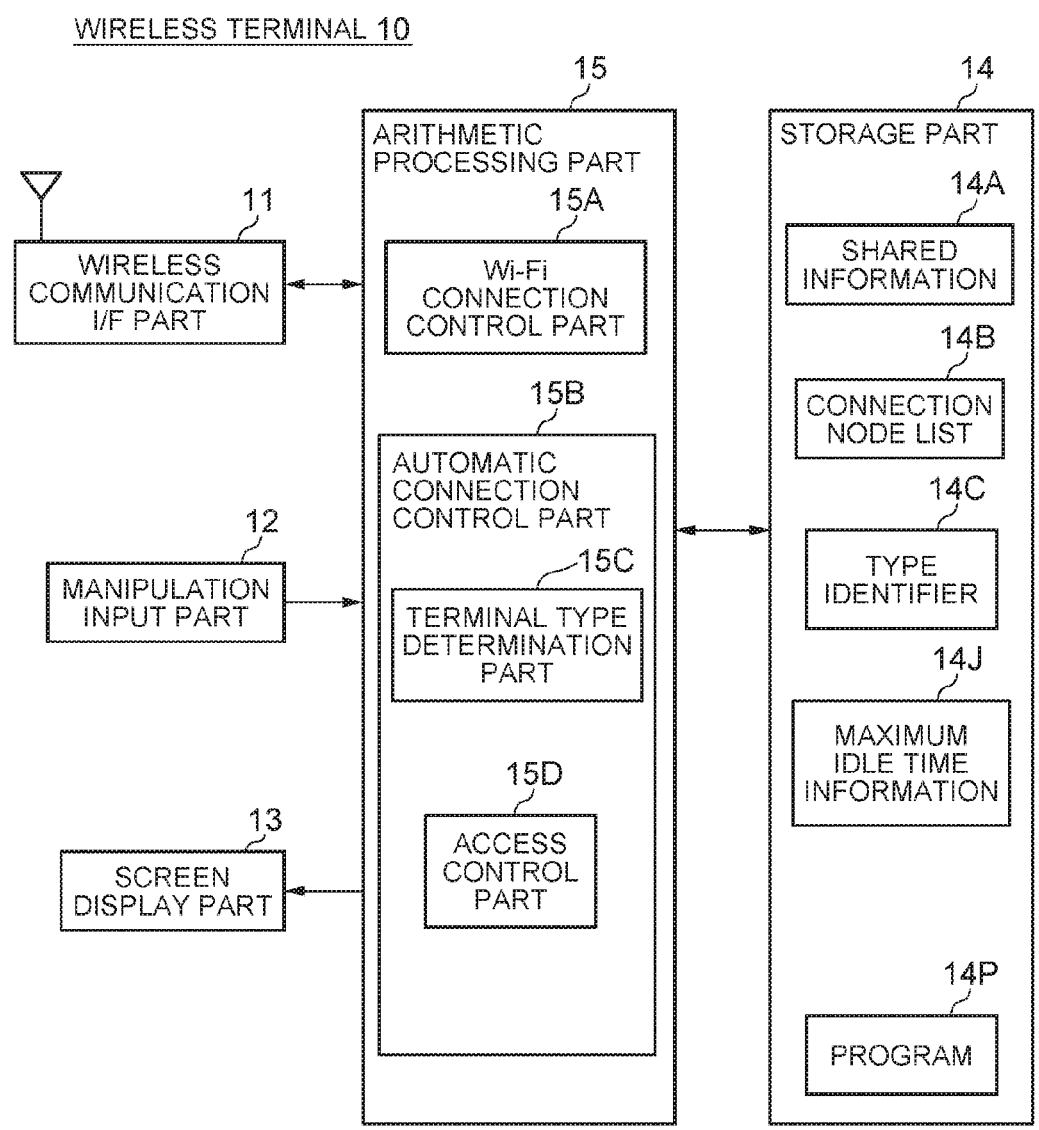
FIG. 22 is a block diagram of a wireless terminal according to a sixth exemplary embodiment of the present invention.

FIG. 22 is a block diagram showing an example of the configuration of the wireless terminal 10 according to this exemplary embodiment, and the same part as in FIG. 3 is denoted by the same reference numeral. In the storage part 14 of the wireless terminal 10 shown in FIG. 22, maximum idle time information 14J is stored.

Figure 23:
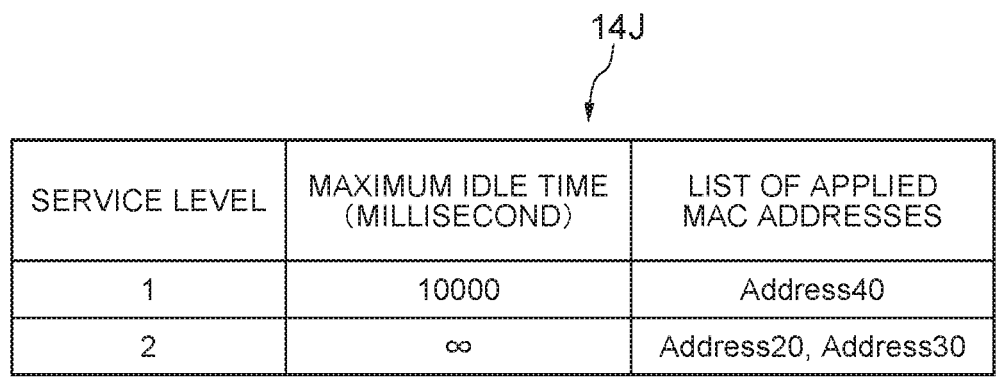
FIG. 23 is a diagram showing an example of maximum idle time information stored in the wireless terminal according to the sixth exemplary embodiment of the present invention.

FIG. 23 shows an example of the configuration of the maximum idle time information 14J. The maximum idle time information 14J in this example includes a plurality of entries each holding a combination of a service level, a maximum idle time and a list of applied MAC addresses. In the maximum idle time, the maximum value of an allowable idle time is stored. An idle time is a time in which no packet flows in a communication link. On the list of applied MAC addresses, the MAC address of another wireless terminal to which the service level is applied. In the service level and the maximum idle time, desired data is recorded, for example, at the time of initialization of the wireless terminal 10. In FIG. 23, a maximum idle time of 10000 milliseconds is recorded at the service level 1, and a symbol representing an unlimited maximum idle time is recorded at the service level 2.

The access control part 15D of the wireless terminal 10 receives the MAC address of another wireless terminal and terminal type information representing whether or not the other wireless terminal is a universal terminal from the terminal type determination part 15C, and registers the MAC address of a universal terminal on the list of applied MAC addresses of the service level 1 of the maximum idle time information 14J, whereas registers the MAC address of a dedicated terminal on the list of applied MAC addresses of the service level 2.

Further, with reference to the maximum idle time information 14J, the access control part 15D controls an allowable idle time depending on whether or not another wireless terminal is a universal terminal. To be specific, the access control part 15D checks whether the MAC address of another wireless terminal is registered at the service level 1 or at the service level 2 of the maximum idle time information 14J. For a wireless terminal registered at the service level 1, when detecting that no packet has flown for a time equal to or more than the maximum idle time of the service level 1, the access control part 15D forcibly terminates connection to the wireless terminal. On the other hand, for a wireless terminal registered at the service level 2, the access control part 15D does not perform disconnection due to timeout of the idle time. Consequently, unauthorized use such as cracking by a universal terminal is prevented.

[Seventh Exemplary Embodiment]

An exemplary embodiment in which the flow amount of traffic flowing through a wireless LAN is controlled depending on whether or not a connection destination wireless terminal is a universal terminal will be described below.

Figure 24:
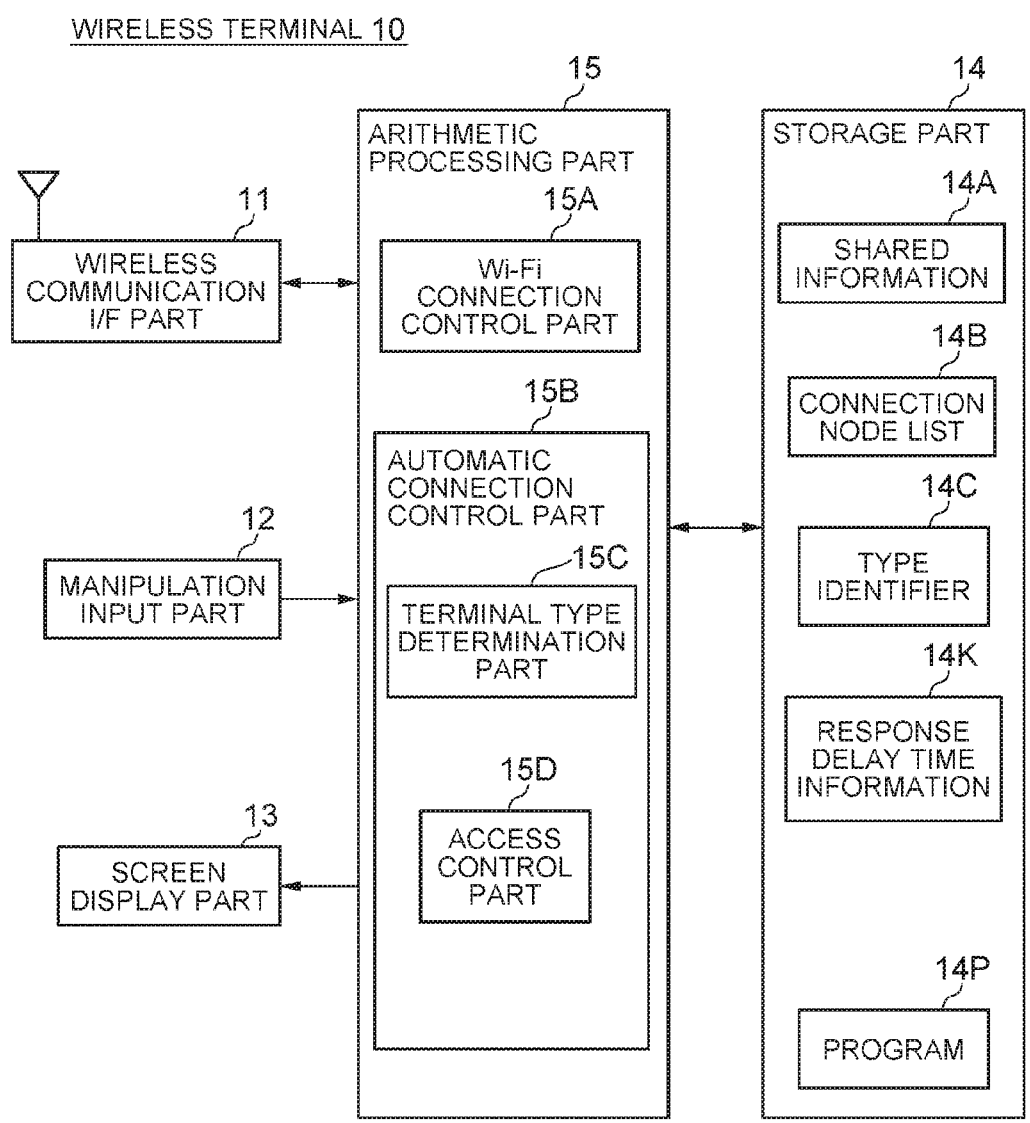
FIG. 24 is a block diagram of a wireless terminal according to a seventh exemplary embodiment of the present invention.

FIG. 24 is a block diagram showing an example of the configuration of the wireless terminal 10 according to this exemplary embodiment, and the same part as in FIG. 3 is denoted by the same reference numeral. In the storage part 14 of the wireless terminal 10 shown in FIG. 24, response delay time information 14K is stored.

Figure 25:
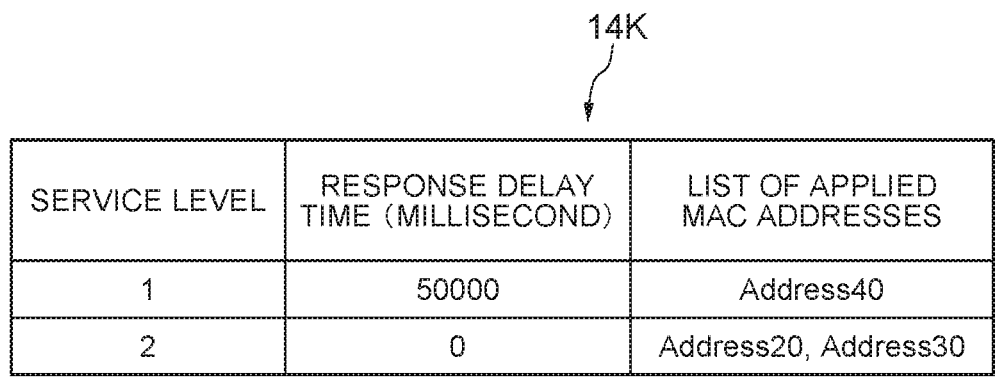
FIG. 25 is a diagram showing an example of response delay time information stored in the wireless terminal according to the seventh exemplary embodiment of the present invention.

FIG. 25 shows an example of the configuration of the response delay time information 14K. The response delay time information 14K in this example includes a plurality of entries each holding a combination of a service level, a response delay time and a list of applied MAC addresses. In the response delay time, a time for which an acknowledgment (ACK) is purposely delayed is stored. On the list of applied MAC addresses, the MAC address of another wireless terminal to which the service level is applied is recorded. In the service level and the response delay time, desired data is recorded, for example, at the time of initialization of the wireless terminal 10. In FIG. 25, a response delay time of 50000 milliseconds is recorded at the service level 1, and a response delay time of 0 second, which represents an acknowledgment is not purposely delayed, is recorded at the service level 2.

The access control part 15D of the wireless terminal 10 receives the MAC address of another wireless terminal and terminal type information representing whether or not the other wireless terminal is a universal terminal from the terminal type determination part 15C, and registers the MAC address of a universal terminal on the list of applied MAC addresses of the service level 1 of the response delay time information 14K, whereas registers the MAC address of a dedicated terminal on the list of applied MAC addresses of the service level 2.

Further, with reference to the response delay time information 14K, the access control part 15D controls an acknowledgment delay time depending on whether or not another wireless terminal is a universal terminal. To be specific, in a case where the wireless terminal 10 is a receiver and another wireless terminal is a transmitter, the access control part 15D checks whether the MAC address of the transmitter wireless terminal is registered at the service level 1 or at the service level 2 of the response delay time information 14K. In the case of a wireless terminal registered at the service level 1, the access control part 15D purposely delays transmission of an acknowledgment to be transmitted to the transmitter wireless terminal by the response delay time recorded at the service level 1. Meanwhile, in the case of a wireless terminal registered at the service level 2, the access control part 15D does not execute such processing of purposely delaying an acknowledgment. Generally in TCP communication, a throughput is inversely proportional to a round trip time (RTT). An RTT is a time from transmission of a packet by a transmitter to transmission of an acknowledgment to the transmitter by a receiver and reception of the acknowledgment by the transmitter. Therefore, when an acknowledgment is purposely delayed, an RTT increases and a throughput decreases. Consequently, unauthorized use such as cracking by a universal terminal is prevented.

Meanwhile, in a case where the wireless terminal 10 is the group owner of a P2P group and one or more clients are present, the wireless terminal 10 may notify an existing client of whether or not another wireless terminal newly connected is a universal terminal and cause the existing client to execute the delay processing on an acknowledgment as described above. Consequently, it becomes possible to execute the delay processing on an acknowledgment also when data communication is performed between another wireless terminal and an existing client via the wireless terminal 10.

[Eighth Exemplary Embodiment]

An exemplary embodiment in which the maximum amount of traffic is controlled depending on whether or not a connection destination wireless terminal is a universal wireless terminal.

Figure 26:
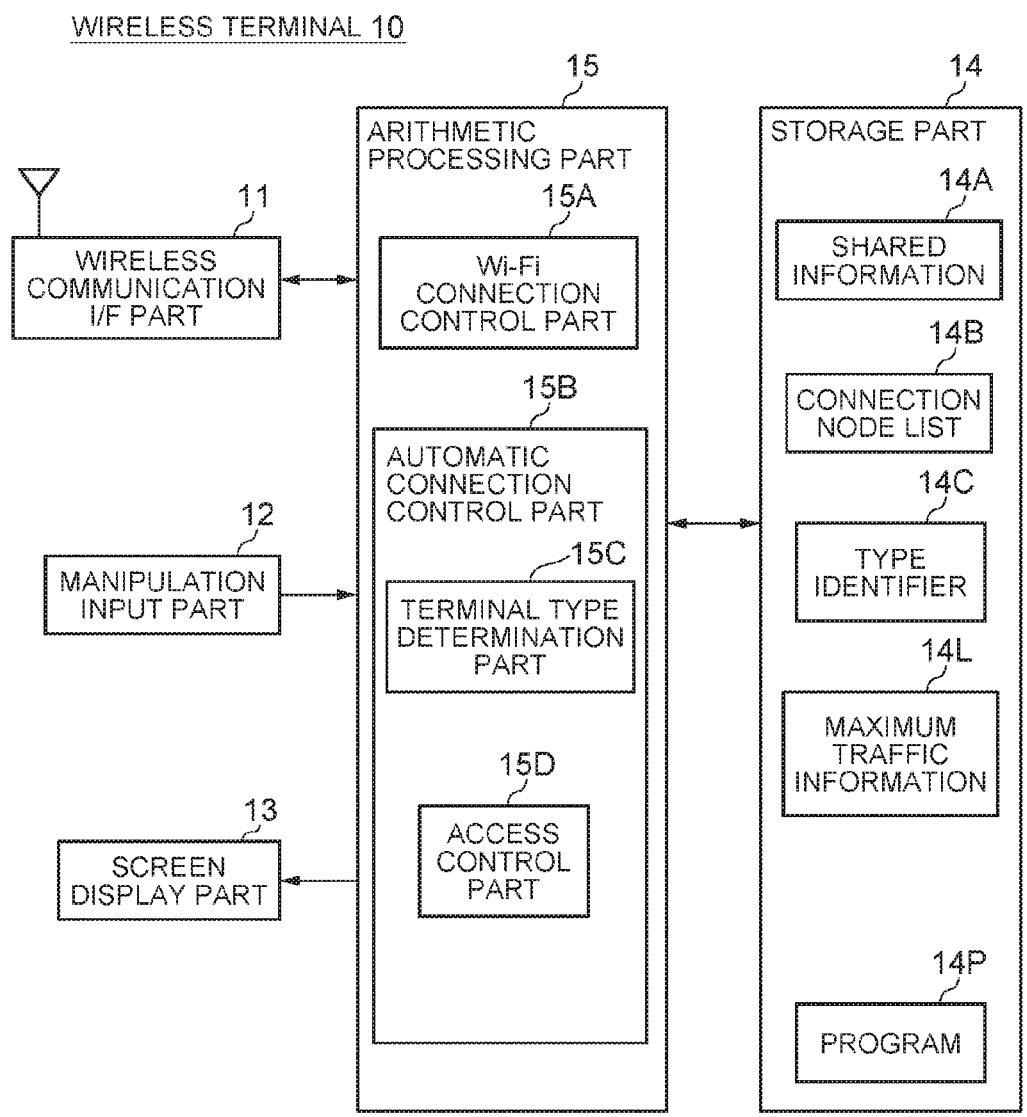
FIG. 26 is a block diagram of a wireless terminal according to an eighth exemplary embodiment of the present invention.

FIG. 26 is a block diagram showing an example of the configuration of the wireless terminal 10 according to this exemplary embodiment, and the same part as in FIG. 3 is denoted by the same reference numeral. In the storage part 14 of the wireless terminal 10 shown in FIG. 26, maximum traffic information 14L is stored.

Figure 27:
FIG. 27 is a diagram showing an example of maximum traffic information stored in the wireless terminal according to the eighth exemplary embodiment of the present invention.

FIG. 27 shows an example of the configuration of the maximum traffic information 14L. The maximum traffic information 14L in this example includes a plurality of entries each holding a combination of a service level, maximum traffic and the list of applied MAC addresses. In the maximum traffic, the maximum amount of allowable traffic is stored. On the list of applied MAC addresses, the MAC address of another wireless terminal to which the service level is applied is recorded. In the service level and the maximum traffic, desired data is recorded, for example, at the time of initialization of the wireless terminal 10. In FIG. 27, maximum traffic of 50 kilobytes is recorded at the service level 1, and a symbol representing unlimited maximum traffic is recorded at the service level 2.

The access control part 15D of the wireless terminal 10 receives the MAC address of another wireless terminal and terminal type information representing whether or not the other wireless terminal is a universal terminal from the terminal type determination part 15C, and registers the MAC address of a universal terminal on the list of applied MAC addresses of the service level 1 of the maximum traffic information 14L, whereas registers the MAC address of a dedicated terminal on the list of applied MAC addresses of the service level 2.

Further, with reference to the maximum traffic information 14L, the access control part 15D controls the maximum amount of traffic in accordance with the type of another wireless terminal. To be specific, in transmission and reception between the wireless terminal 10 and another wireless terminal, the access control part 15D checks whether the MAC address of the other wireless terminal is registered at the service level 1 or at the service level 2 of the maximum traffic information 14L. Then, in the case of a wireless terminal registered at the service level 1, at a moment that the total amount of transmission/reception data reaches the maximum traffic recorded at the service level 1, the access control part 15D forcibly terminates connection with the wireless terminal. Meanwhile, in the case of a wireless terminal registered in the service level 2, the access control part 15D does not execute such restriction based on the maximum traffic. Consequently, unauthorized use such as cracking by a universal terminal is prevented.

Meanwhile, in a case where the wireless terminal 10 is the group owner of a P2P group and one or more clients are present, the wireless terminal 10 may notify an existing client of whether or not another wireless terminal newly connected is a universal terminal and cause the existing client to monitor the maximum traffic and terminate connection as described above. In this case, disconnection is performed by a group owner in response to a request by an existing client.

[Other Exemplary Embodiments]

Although the present invention has been described above by using some exemplary embodiments, the present invention is not limited to the exemplary embodiments described above and can be changed and modified in various manners. For example, an exemplary embodiment as described below can be included in the present invention.

In the first exemplary embodiment described above, only a type identifier representing a dedicated terminal is used. However, a type identifier representing a universal terminal such as a smartphone may be used additionally.

In the first exemplary embodiment described above, a type identifier is inserted into the Device Name attribute value. However, a type identifier may be added to an attribute value other than the attribute value of Device Name, for example, added to an attribute value of P2P Device ID or P2P Capability, another attribute value of Device Info, or an attribute value of Group Info. Otherwise, a type identifier may be added to an attribute value of vendor information or vendor specific information (Vendor Specific Attribute). In these cases, the terminal type determination part 15C of the wireless terminal 10 detects a previously defined type identifier from such an attribute value.

Further, in the first exemplary embodiment described above, a letter or the like representing a type identifier is newly added to an existing attribute value, but part or all of an existing attribute value may be used as a type identifier. For example, a portion "Dev1234" shown in FIG. 5 may be used as a type identifier. In this case, the same number of type identifiers 14C as the number of wireless terminals belonging to the second type are registered in the storage part 14. Moreover, the terminal type determination part 15C determines a wireless terminal having Device Name consistent with any of the registered type identifiers 14C as a dedicated terminal, and determines others as universal terminals. Instead of Device Name, the abovementioned other attribute value or part or all of the MAC address of a wireless terminal may be utilized as a type identifier.

Further, in the respective exemplary embodiments described above, there are two access restriction levels or service levels, but three or more access restriction levels or service levels may be set.

Although the present invention has been described above with reference to the exemplary embodiments, the present invention is not limited to the exemplary embodiments described above. The configurations and details of the present invention can be changed in various manners that can be understood by one skilled in the art within the scope of the present invention.

[Supplementary Note 1]

A wireless terminal capable of establishing a peer-to-peer wireless connection with an another wireless terminal, the wireless terminal comprising:

a terminal type determination part configured to determine whether or not the another wireless terminal is a universal terminal on a basis of information received from the another wireless terminal; and an access control part configured to control access to a resource in the wireless terminal by the another wireless terminal after a connection is established in accordance with a result of determination by the terminal type determination part.

[Supplementary Note 2]

The wireless terminal according to Supplementary Note 1, wherein the terminal type determination part is configured to detect a previously defined type identifier from a given frame transmitted to or received from the another wireless terminal in accordance with Wi-Fi Direct specification and to determine whether or not the another wireless terminal is the universal terminal.

[Supplementary Note 3]

The wireless terminal according to Supplementary Note 1 or 2, wherein the frame is a frame relating to any of Probe Request, Probe Response, GO Negotiation Request, GO Negotiation Response, Provision Discovery Request and Invitation Request.

[Supplementary Note 4]

The wireless terminal according to any of Supplementary Notes 1 to 3, wherein the terminal type determination part is configured to detect the type identifier from a value of Device Name attribute in the frame.

[Supplementary Note 5]

The wireless terminal according to any of Supplementary Notes 1 to 4, wherein the terminal type determination part is configured to detect the type identifier from a value of Device ID attribute in the frame.

[Supplementary Note 6]

The wireless terminal according to any of Supplementary Notes 1 to 5, wherein the terminal type determination part is configured to detect the type identifier from a value of Capability attribute in the frame.

[Supplementary Note 7]

The wireless terminal according to any of Supplementary Notes 1 to 6, wherein the terminal type determination part is configured to detect the type identifier from a value of an another attribute of Device Info attribute, a value of Group Info attribute, an attribute value of vendor information or vendor specific information (Vendor Specific Attribute) in the frame.

[Supplementary Note 8]

The wireless terminal according to any of Supplementary Notes 1 to 7, wherein the terminal type determination part is configured to determine whether the another wireless terminal is the universal terminal or a dedicated terminal on a basis of information of authentication performed between the wireless terminal and the another wireless terminal in accordance with Wi-Fi Direct specification.

[Supplementary Note 9]

The wireless terminal according to any of Supplementary Notes 1 to 8, wherein the terminal type determination part is configured to determine the another wireless terminal requesting push button authentication as the universal terminal and determine the another wireless terminal requesting PIN authentication as the dedicated terminal.

[Supplementary Note 10]

The wireless terminal according to any of Supplementary Notes 1 to 9, wherein the terminal type determination part is configured to determine the another wireless terminal requesting PIN authentication using a first PIN number as the universal terminal, and determine the another wireless terminal requesting PIN authentication using a second PIN number as the dedicated terminal.

[Supplementary Note 11]

The wireless terminal according to any of Supplementary Notes 1 to 10, wherein the access control part is configured to control opening and closing of a TCP/UDP port used by an application in accordance with a result of determination by the terminal type determination part.

[Supplementary Note 12]

The wireless terminal according to any of Supplementary Notes 1 to 11, wherein the access control part is configured to switch application programs to start in accordance with a result of determination by the terminal type determination part.

[Supplementary Note 13]

The wireless terminal according to any of Supplementary Notes 1 to 12, wherein the access control part is configured to change a maximum connection time of a wireless LAN in accordance with a result of determination by the terminal type determination part.

[Supplementary Note 14]

The wireless terminal according to any of Supplementary Notes 1 to 13, wherein the access control part is configured to change a maximum idle time of a wireless LAN in accordance with a result of determination by the terminal type determination part.

[Supplementary Note 15]

The wireless terminal according to any of Supplementary Notes 1 to 14, wherein the access control part is configured to control a flow amount of traffic flowing in a wireless LAN in accordance with a result of determination by the terminal type determination part.

[Supplementary Note 16]

The wireless terminal according to any of Supplementary Notes 1 to 15, wherein the access control part is configured to control a maximum amount of traffic in accordance with a result of determination by the terminal type determination part.

[Supplementary Note 17]

A communication control method of a wireless terminal capable of establishing a peer-to-peer wireless connection with an another wireless terminal, the communication control method comprising:

determining whether or not the another wireless terminal is a universal terminal on a basis of information received from the another wireless terminal; and controlling access to a resource in the wireless terminal by the another wireless terminal after a connection is established in accordance with a result of the determining.

[Supplementary Note 18]

A computer program comprising instructions for causing a computer, which is capable of establishing a peer-to-peer wireless connection with a wireless terminal, to function as:

a terminal type determination part configured to determine whether or not the wireless terminal is a universal terminal on a basis of information received from the wireless terminal; and an access control part configured to control access to a resource in the computer by the wireless terminal after a connection is established in accordance with a result of determination by the terminal type determination part.

[Supplementary Note 19]

A communication method in a wireless communication network in which a first wireless terminal establishes a peer-to-peer wireless connection with a second wireless terminal, the communication method comprising:

determining, by the first wireless terminal, whether or not the second wireless terminal is a universal terminal on a basis of information received from the second wireless terminal; and controlling, by the first wireless terminal, access to a resource in the first wireless terminal by the second wireless terminal after a connection is established in accordance with a result of the determining.

[Supplementary Note 20]

A communication system in a wireless communication network including a first wireless terminal and a second wireless terminal capable of establishing a peer-to-peer wireless connection with the first second wireless terminal, wherein the first wireless terminal includes:

a terminal type determination part configured to determine whether or not the second wireless terminal is a universal terminal on a basis of information received from the second wireless terminal; and an access control part configured to control access to a resource in the first wireless terminal by the second wireless terminal after a connection is established in accordance with a result of determination by the terminal type determination part.

INDUSTRIAL APPLICABILITY

The present invention can be applicable to a P2P network including a node (a wireless terminal) capable of establishing a peer-to-peer wireless connection to another wireless terminal.

DESCRIPTION OF NUMERALS 10, 20, 30, 40 wireless terminal
10A, 20A vehicle
30A facility
40A user
11 wireless communication I/F part
12 manipulation input part
13 screen display part
14 storage part
14A shared information
14B connection node list
14C type identifier
14D access restriction information
14E PIN number
14F first PIN number
14G second PIN number
14H application program information
14I maximum connection time information
14J maximum idle time information
14K response delay time information
14L maximum traffic information
14P program
15 arithmetic processing part
15A Wi-Fi connection control part
15B automatic connection control part
15C terminal type determination part
15D access control part

The invention claimed is:

1. A wireless terminal capable of establishing a peer-to-peer wireless connection with an another wireless terminal, the wireless terminal comprising:

a memory configured to store one or more instructions; and a processor configured to execute the one or more instructions to implement:

a terminal type determination part configured to determine whether or not the another wireless terminal is a universal terminal on a basis of information received from the another wireless terminal; and an access control part configured to control access to a resource in the wireless terminal by the another wireless terminal after a connection is established in accordance with a result of determination by the terminal type determination part, wherein the terminal type determination part is further configured to detect a previously defined type identifier from a frame transmitted to or received from the other wireless terminal in accordance with Wi-Fi Direct specification and to determine whether or not the other wireless terminal is the universal terminal.

2. The wireless terminal according to claim 1, wherein the frame is a frame relating to any of Probe Request, Probe Response, GO Negotiation Request, GO Negotiation Response, Provision Discovery Request and Invitation Request.

3. The wireless terminal according to claim 1, wherein the terminal type determination part is configured to detect the type identifier from a value of Device Name attribute in the frame.

4. The wireless terminal according to claim 1, wherein the terminal type determination part is configured to detect the type identifier from a value of Device ID attribute in the frame.

5. The wireless terminal according to claim 1, wherein the terminal type determination part is configured to detect the type identifier from a value of Capability attribute in the frame.

6. The wireless terminal according to claim 1, wherein the terminal type determination part is configured to detect the type identifier from a value of an another attribute of Device Info attribute, a value of Group Info attribute, an attribute value of vendor information or vendor specific information (Vendor Specific Attribute) in the frame.

7. The wireless terminal according to claim 1, wherein the terminal type determination part is configured to determine whether the another wireless terminal is the universal terminal or a dedicated terminal on a basis of information of authentication performed between the wireless terminal and the another wireless terminal in accordance with Wi-Fi Direct specification.

8. The wireless terminal according to claim 7, wherein the terminal type determination part is configured to determine the another wireless terminal requesting push button authentication as the universal terminal and determine the another wireless terminal requesting PIN authentication as the dedicated terminal.

9. The wireless terminal according to claim 7, wherein the terminal type determination part is configured to determine the another wireless terminal requesting PIN authentication using a first PIN number as the universal terminal, and determine the another wireless terminal requesting PIN authentication using a second PIN number as the dedicated terminal.

10. The wireless terminal according to claim 1, wherein the access control part is configured to control opening and closing of a TCP/UDP port used by an application in accordance with a result of determination by the terminal type determination part.

11. The wireless terminal according to claim 1, wherein the access control part is configured to switch application programs to start in accordance with a result of determination by the terminal type determination part.

12. The wireless terminal according to claim 1, wherein the access control part is configured to change a maximum connection time of a wireless LAN in accordance with a result of determination by the terminal type determination part.

13. The wireless terminal according to claim 1, wherein the access control part is configured to change a maximum idle time of a wireless LAN in accordance with a result of determination by the terminal type determination part.

14. The wireless terminal according to claim 1, wherein the access control part is configured to control a flow amount of traffic flowing in a wireless LAN in accordance with a result of determination by the terminal type determination part.

15. The wireless terminal according to claim 1, wherein the access control part is configured to control a maximum amount of traffic in accordance with a result of determination by the terminal type determination part.

16. A communication control method of a wireless terminal capable of establishing a peer-to-peer wireless connection with an another wireless terminal, the communication control method comprising:
  determining whether or not the another wireless terminal is a universal terminal on a basis of information received from the another wireless terminal; and
  controlling access to a resource in the wireless terminal by the another wireless terminal after a connection is established in accordance with a result of the determining,
  wherein the determining includes detecting a previously defined type identifier from a frame transmitted to or received from the other wireless terminal in accordance with Wi-Fi Direct specification and determining whether or not the other wireless terminal is the universal terminal.

17. A communication system in a wireless communication network including a first wireless terminal and a second wireless terminal capable of establishing a peer-to-peer wireless connection with the first second wireless terminal, wherein the first wireless terminal comprises:
  a memory configured to store one or more instructions; and
  a processor configured to execute the one or more instructions to implement:
    a terminal type determination part configured to determine whether or not the second wireless terminal is a universal terminal on a basis of information received from the second wireless terminal; and
    an access control part configured to control access to a resource in the first wireless terminal by the second wireless terminal after a connection is established in accordance with a result of determination by the terminal type determination part,
  wherein the terminal type determination part is further configured to detect a previously defined type identifier from a frame transmitted to or received from the second wireless terminal in accordance with Wi-Fi Direct specification and to determine whether or not the second wireless terminal is the universal terminal.

* * * * *